US012450890B2

(12) United States Patent
Yang et al.

(10) Patent No.: US 12,450,890 B2
(45) Date of Patent: Oct. 21, 2025

(54) CLASSIFICATION AND PREDICTION METHOD AND APPARATUS, DEVICE, STORAGE MEDIUM, AND COMPUTER PROGRAM PRODUCT

(71) Applicant: Tencent Technology (Shenzhen) Company Limited, Guangdong (CN)

(72) Inventors: Fan Yang, Guangdong (CN); Zongbo Han, Guangdong (CN); Changqing Zhang, Guangdong (CN); Jianhua Yao, Guangdong (CN)

(73) Assignee: Tencent Technology (Shenzhen) Company Limited (CN)

( * ) Notice: Subject to any disclaimer, the term of this patent is extended or adjusted under 35 U.S.C. 154(b) by 335 days.

(21) Appl. No.: 18/211,722

(22) Filed: Jun. 20, 2023

(65) Prior Publication Data

US 2023/0334840 A1    Oct. 19, 2023

Related U.S. Application Data

(63) Continuation of application No. PCT/CN2022/132443, filed on Nov. 17, 2022.

(30) Foreign Application Priority Data

Jan. 14, 2022    (CN) .......................... 202210043188.2

(51) Int. Cl.
*G06V 10/80*    (2022.01)
*G06V 10/82*    (2022.01)

(52) U.S. Cl.
CPC ............ *G06V 10/811* (2022.01); *G06V 10/82* (2022.01)

(58) Field of Classification Search
CPC ............................... G06V 10/811; G06V 10/82
See application file for complete search history.

(56) References Cited

U.S. PATENT DOCUMENTS 9,436,875 B2 *    9/2016    Curcio ................... G06V 20/46
9,805,255 B2 *    10/2017    Yang .................... G06F 18/2163
(Continued)

FOREIGN PATENT DOCUMENTS

CN    1945602 A    4/2007
CN    107609712 A    1/2018
(Continued)

OTHER PUBLICATIONS

Thome, Nicolas et al. "Addressing failure prediction by learning model confidence." *33rd Conference on Neural Information Processing Systems*, Oct. 26, 2019, 20 pages.
(Continued)

*Primary Examiner* — Manav Seth
(74) *Attorney, Agent, or Firm* — Crowell & Moring LLP

(57) ABSTRACT

The present subject matter relates to the field of machine learning and provides a classification and prediction method and apparatus, a device, a storage medium, and a computer program product. At least two pieces of data are acquired for a specified classification task. Each piece of data corresponds to one modality. A confidence corresponding to each of at least two modalities is acquired. The confidence indicates a classification and prediction probability of the modality in the specified classification task. Weighted fusion on data features of the at least two pieces of data is performed based on the confidence corresponding to each of the at least two modalities to obtain a fused feature. A prediction is performed according to the fused feature to obtain a classification and prediction result corresponding to the specified classification task.

19 Claims, 11 Drawing Sheets

(56) References Cited

U.S. PATENT DOCUMENTS

| | | | |
|---|---|---|---|
| 10,068,171 B2* | 9/2018 | Wshah | G06V 10/806 |
| 11,176,417 B2* | 11/2021 | Aides | G06V 10/764 |
| 11,538,577 B2* | 12/2022 | Rahman | G06N 3/045 |
| 12,008,336 B2* | 6/2024 | Tu | G06F 40/30 |
| 12,067,725 B2* | 8/2024 | Wang | A61B 5/055 |
| 12,169,932 B2* | 12/2024 | Goto | G06V 10/811 |
| 12,205,344 B2* | 1/2025 | Wang | G06V 10/56 |
| 12,263,849 B2* | 4/2025 | Tang | B60W 60/0011 |
| 12,293,273 B2* | 5/2025 | Wang | G06N 3/044 |
| 2008/0208072 A1* | 8/2008 | Fadem | A61B 5/291 600/544 |
| 2017/0228618 A1* | 8/2017 | Jiang | G06F 16/70 |
| 2021/0192220 A1* | 6/2021 | Qu | G06V 20/46 |
| 2021/0280276 A1 | 9/2021 | Gupta et al. | |
| 2023/0169323 A1* | 6/2023 | Kolagunda | G06N 3/08 706/25 |
| 2024/0203599 A1* | 6/2024 | Liu | G16H 50/70 |
| 2025/0225783 A1* | 7/2025 | Yan | G06V 10/993 |

FOREIGN PATENT DOCUMENTS

| | | |
|---|---|---|
| CN | 110532674 A | 12/2019 |
| CN | 112201228 A | 1/2021 |
| CN | 112401886 | 2/2021 |
| CN | 112418302 | 2/2021 |
| CN | 113762322 | 12/2021 |
| CN | 113822382 A | 12/2021 |
| CN | 114398983 | 4/2022 |

OTHER PUBLICATIONS

Han, Zongbo et al. "Multimodal dynamics: Dynamical fusion for trustworthy multimodal classification." *In Proceedings of the IEEE/CVF conference on computer vision and pattern recognition*, Dec. 31, 2022, 11 pages.

International Search Report issued Feb. 7, 2023 in International (PCT) Application No. PCT/CN2022/132443.

* cited by examiner

CLASSIFICATION AND PREDICTION METHOD AND APPARATUS, DEVICE, STORAGE MEDIUM, AND COMPUTER PROGRAM PRODUCT

RELATED APPLICATION

The present application is a continuation of PCT application PCT/CN2022/132443, which claims priority to Chinese Patent Application No. 202210043188.2, filed on Jan. 14, 2022 and entitled "CLASSIFICATION AND PREDICTION METHOD AND APPARATUS, DEVICE, STORAGE MEDIUM, AND COMPUTER PROGRAM PRODUCT", which is incorporated herein by reference in its entirety.

FIELD OF THE TECHNOLOGY

The present subject matter relates to the field of machine learning, and in particular, to a classification and prediction method and apparatus, a device, a storage medium, and a computer program product.

BACKGROUND

Multimodal fusion learning refers to fusion of a plurality of modalities of different categories by deep learning to obtain a general common representation of the plurality of modalities for understanding and generation of classification tasks.

In the related art, multimodal fusion learning is to input the plurality of modalities into respective single-modality network structures, extract respective deep features, then fuse the deep features through multi-layer neural networks, and map fusion results to a public space, so as to acquire the general common representation corresponding to the plurality of modalities and apply the common representation to the classification tasks for classification analysis.

However, in the related art, the accuracy of classification results is relatively low due to the great difference among the plurality of modalities.

BRIEF SUMMARY

Examples of the present subject matter provide a classification and prediction method and apparatus, a device, a storage medium, and a computer program product, so that the accuracy of classification and prediction can be improved. The technical solutions are as follows.

According to an aspect, a classification and prediction method is provided. The method includes:
acquiring at least two pieces of data for a specified classification task, the at least two pieces of data corresponding to at least two modalities, each piece of data corresponding to one modality;
acquiring a confidence corresponding to each of the at least two modalities, the confidence indicates a classification and prediction probability of the modality in the specified classification task;
performing weighted fusion on data features of the at least two pieces of data based on the confidence corresponding to each of the at least two modalities, to obtain a fused feature; and performing prediction according to the fused feature to obtain a classification and prediction result corresponding to the specified classification task.

According to another aspect, a classification and prediction apparatus is provided, including:
an acquisition module, configured to acquire at least two pieces of data for a specified classification task, the at least two pieces of data corresponding to at least two modalities, each piece of data corresponding to one modality;
the acquisition module is further configured to acquire a confidence corresponding to each of the at least two modalities, the confidence indicates a classification and prediction probability of the modality in the specified classification task;
a fusion module, configured to perform weighted fusion on data features of the at least two pieces of data based on the confidence corresponding to each of the at least two modalities, to obtain a fused feature; and
a prediction module, configured to perform prediction according to the fused feature to obtain a classification and prediction result corresponding to the specified classification task.

According to another aspect, a computer device is provided, including a processor and a memory, the memory storing at least one instruction, at least one program, a code set, or an instruction set, the at least one instruction, the at least one program, the code set, or the instruction set is loaded and executed by the processor to implement the classification and prediction method according to any one of the foregoing examples of the present subject matter.

According to another aspect, a non-transitory computer-readable storage medium is provided, storing at least one instruction, at least one program, a code set, or an instruction set, the at least one instruction, the at least one program, the code set, or the instruction set is loaded and executed by a processor to implement the classification and prediction method according to any one of the foregoing examples of the present subject matter.

According to another aspect, a computer program product or a computer program is provided, the computer program product or the computer program including a computer instruction, the computer instruction is stored in a computer-readable storage medium. The processor of the computer device reads the computer instruction from the computer-readable storage medium. The processor executes the computer instruction, causing the computer device to perform the classification and prediction method according to any one of the foregoing examples.

Beneficial effects brought by the technical solutions provided in the examples of the present subject matter include at least the following.

A confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

In the medical field, different disease grades corresponding to the same disease are regarded as a specified classification task, and different pathological parameters that determine results of disease grades correspond to different modalities. The same kind of pathological parameters are used as the data included in the same modality, and the confidence corresponding to each modality is determined by introducing a confidence. Based on the confidence corresponding to each modality, weighted fusion is performed on the data features corresponding to the data in each modality to obtain a fused feature, and the disease grade result is determined according to the fused feature, which is suitable for improving the accuracy of making personal medical plans for patients under precise medical care.

DETAILED DESCRIPTION

Figure 1:
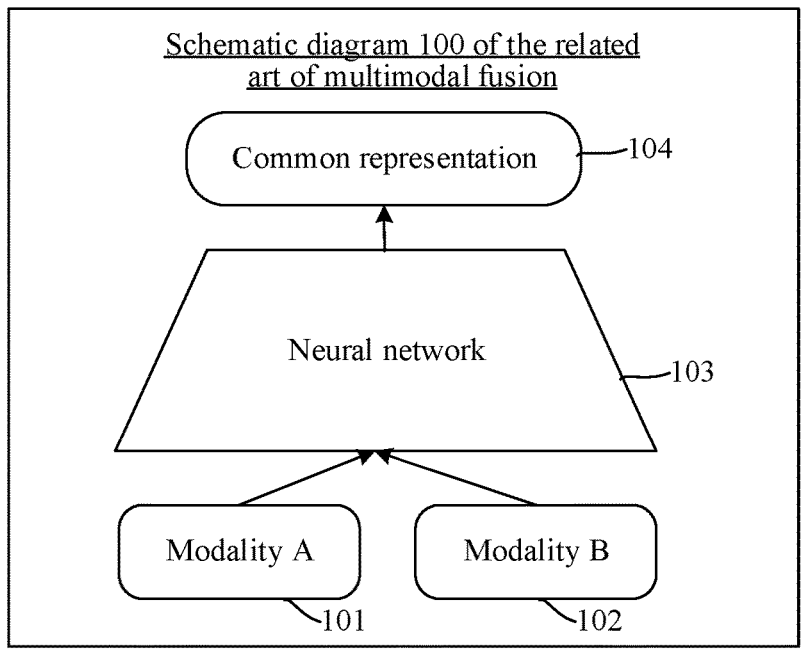
FIG. 1 is a schematic diagram of the related art of a classification and prediction method according to an example of the present subject matter.

To make the objectives, technical solutions, and advantages of the present subject matter clearer, the following further describes implementations of the present subject matter in detail with reference to the accompanying drawings. According to the present subject matter, a prompt interface and a pop-up window may be displayed or voice prompt information is outputted before collecting relevant data of a user (for example, disease-related data in a medical scene) and during collection of relevant data of the user. The prompt interface, the pop-up window, or the voice prompt information prompts relevant data of the user is collected currently, so that the present subject matter starts the relevant steps of acquiring user-related data only after acquiring a confirmation operation of the user on the prompt interface or the pop-up window, or otherwise (that is, when the confirmation operation of the user on the prompt interface or the pop-up window is not acquired), the relevant steps of acquiring user-related data are ended, that is, the user-related data is not acquired. In other words, all user data collected in the present subject matter are collected with the consent and authorization of users, and the collection, use, and processing of relevant user data need to comply with relevant laws, regulations, and standards of relevant countries and regions.

First, terms involved in the examples of the present subject matter are briefly introduced.

Modality: Every source or form of information may be referred to as a modality. For example, a person has a sense of touch and a sense of hearing. Media of information include voice, a video, texts, and the like. A wide variety of sensors include a radar, infrared, an accelerometer, and the like. Each of the foregoing may be referred to as a modality. In the example of the present subject matter, the modality indicates a data set from a same data source. For example, after a tumor tissue is acquired, mRNA transcription data, DNA methylation data, and miRNA data are acquired by sequencing. The mRNA transcription data is a modality, the DNA methylation data is a modality, and the miRNA data is a modality.

Confidence: It is also referred to as a confidence level, and is a probability that the overall parameter value falls within a certain interval of sample statistical values. For example, it is estimated that an event is to be completed in 3 to 4 days, but the accuracy of the prediction result is only about 80%. That is to say, an interval in 3 to 4 days is a sample confidence interval (an estimated interval) corresponding to the event, and 80% is the confidence corresponding to the estimated sample.

In this example, the confidence indicates the accuracy corresponding to a classification and prediction probability corresponding to a specified classification task in a modality. For example, it is necessary to acquire mRNA transcription data, DNA methylation data, and miRNA data to determine a corresponding stage of a certain cancer in a patient. The mRNA transcription data is a modality. When a value of the mRNA transcription data is between 50 and 60, a certain cancer corresponds to stage I, but the accuracy of determining the cancer as stage I based on mRNA is 70%. That is to say, 70% is the mRNA transcription data, and the confidence of correspondingly determining the cancer as stage I is 0.7.

Significance: It is also referred to as credibility, and belongs to the same concept as confidence.

In this example, significance indicates a weight value of features corresponding to data for the specified classification task. For a specified classification task, in terms of the contributions of the features corresponding to the data included in the same modality to the classification and prediction result, some data features have greater impact on classification and prediction, and some data features include a small amount of information and have less impact on classification and prediction. Therefore, the data features with greater impact are of greater significance. For example, it is necessary to acquire mRNA transcription data, DNA methylation data, and miRNA data to determine a corresponding stage of a certain cancer in a patient. The mRNA transcription data is a modality. The mRNA transcription data is composed of a plurality of mRNA sequences, and each mRNA sequence has different contribution degrees to classification and prediction. For example, in mRNA transcriptomics, the impact of gene A on classification and prediction is greater than that of gene B, that is, the contribution degree of gene A to classification and prediction is greater than that of gene B, and therefore the significance of gene A is greater than that of gene B. In this example, the significance is expressed as a significance score with a value between 0 and 1.

First, in the related art, FIG. 1 is a schematic diagram of the related art of a classification and prediction method according to an example of the present subject matter. As shown in FIG. 1, at least two modalities are provided for a specified classification task. Each modality includes data of a same data type, such as a modality A 101 and a modality B 102. The modality A 101 and the modality B 102 include different data types. The modality A 101 and the modality B 102 are inputted into respective corresponding single-modality network results, and a deep feature corresponding to data in the modality A 101 and a deep feature corresponding to data in the modality B 102 are respectively extracted. The deep features corresponding to the modality A 101 and the modality B 102 are jointly inputted into a multi-layer neural network 103 for feature fusion to obtain a fusion result, and the fusion result is mapped to a common representation space to obtain a common representation 104 corresponding to the modality A 101 and the modality B 102. The common representation 104 is predicted, and a classification and prediction result corresponding to the common representation 104 is determined according to the specified classification task.

In the foregoing technology, only the deep features respectively corresponding to a plurality of modalities are extracted for fusion to perform classification and prediction. Weights assigned to the modalities are the same, which ignores different impact of the modalities on classification and prediction, and the modalities have certain uncertainties. Simple fusion of the plurality of modalities causes a large error in the classification result and low accuracy of classification and prediction.

According to the classification and prediction method provided in the present subject matter, a confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

Figure 2:
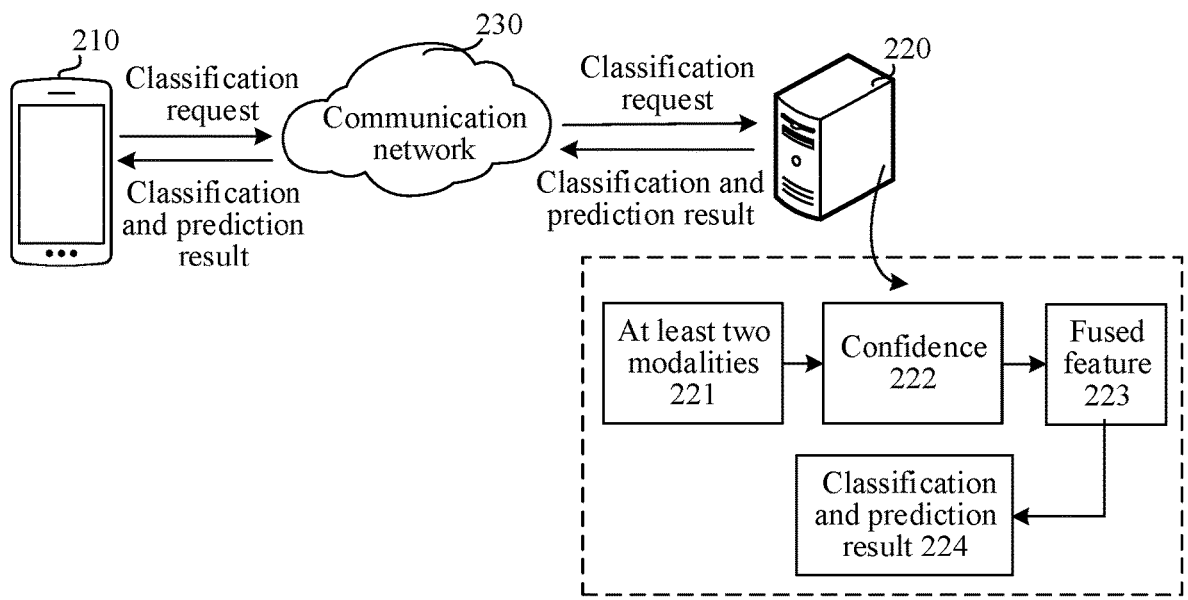
FIG. 2 is a schematic diagram of an implementation environment according to an example of the present subject matter.

The implementation environment involved in the example of the present subject matter is described. For example, refer to FIG. 2. In the implementation environment, a terminal 210 and a server 220 are involved. The terminal 210 and the server 220 are connected through a communication network 230.

In some examples, the terminal 210 transmits a classification request to the server 220. The classification request includes data corresponding to at least two modalities and a specified classification task. The server 220 performs modality fusion after receiving the data transmitted from the terminal 210, and obtains a final classification and prediction result according to the specified classification task and feeds back the classification and prediction result to the terminal 210.

The server 220 acquires the confidences 222 respectively corresponding to the at least two modalities 221 after receiving the data included in at least two modalities 221, performs weighted fusion on data features corresponding to data based on the confidences 222 respectively corresponding to the at least two modalities 221 to obtain a fused feature 223, performs prediction according to the fused feature 223 to obtain a classification and prediction result 224 corresponding to the specified classification task, and feeds back the classification and prediction result 224 to the terminal 210.

In some other examples, the above classification and prediction process may also be implemented by the terminal 210 alone. For example, the terminal 210 is equipped with a classification and prediction assembly. The classification and prediction assembly is configured to complete the specified classification task. In response to the classification and prediction demand, the terminal 210 inputs data of at least two modalities into the classification and prediction assembly, and the classification and prediction assembly performs modality fusion on the data of the at least two modalities, thereby outputting a final classification and prediction result.

The foregoing terminal 210 may be a mobile phone, a tablet computer, a desktop computer, a portable notebook computer, a smart TV, smart on-board terminal devices in various forms, and the like, which is not limited in the example of the present subject matter.

The foregoing server 220 may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a content delivery network (CDN), a big data and artificial intelligence platform, and the like.

In some examples, the foregoing server 220 may further be implemented as a node in a blockchain system. A blockchain is a new application mode of computer technologies such as distributed data storage, point-to-point transmission, a consensus mechanism, an encryption algorithm, and the like.

Application scenarios of the present subject matter is described by using examples in combination with the foregoing brief introduction to terms and the implementation environment.

1. Application scenario of medical treatment. In the process of determining a tumor stage, data of a tumor tissue of a patient in a plurality of corresponding modalities is acquired, the confidence corresponding to the plurality of modalities is determined by constructing a confidence prediction network, data features corresponding to the data in the plurality of modalities are extracted, and the data features are fused based on the confidence corresponding to each modality, so as to obtain the fusion result and the tumor stage and determine a stage result corresponding to the tumor tissue of the patient. A doctor may obtain mRNA transcription data, DNA methylation data, and miRNA data through sequencing after acquiring tumor tissue of a patient with breast cancer, which respectively correspond to three modalities. The data may be input to a confidence prediction network to obtain the confidence corresponding to each modality. Data features corresponding to the three pieces of data may be extracted. Weighted fusion on the data features may be performed. The confidence corresponds to the modality according to the confidence of each modality to obtain fused features corresponding to the three modalities. The fused features are used in a classification and prediction analysis by PAM50 molecular subtyping (which determines a model of a stage (such as stage I, stage II, and stage III) of breast cancer) to determine a stage of the breast cancer of the patient.

2. Application scenario of weather forecasting. During weather forecast, data in a plurality of modalities corresponding to the weather is acquired. The plurality of modalities include a wind direction, a wind speed, an amount of precipitation, an air temperature, air quality, and the like. After the plurality of modalities are inputted into the confidence prediction network, the confidence corresponding to the plurality of modalities is determined, data features corresponding to the data in the plurality of modalities are extracted, the data features are fused according to the confidences of the modalities to which the data features belong to obtain a fused feature, and a weather condition is predicted based on the fused feature (for example, sunny, cloudy, rainy, or the like).

3. Application scenario of video labeling. In order to facilitate the recommendation and search of a video published on the Internet, it is necessary to label the video. During the labeling of the video, data in a plurality of modalities corresponding to the video may be acquired. The plurality of modalities include a title text, audio and video pictures, and the like. After the plurality of modalities are inputted into the confidence prediction network, the confidence corresponding to the plurality of modalities is determined, data features corresponding to the data in the plurality of modalities are extracted, the data features are fused according to the confidence of the modalities to which a model belongs to obtain a fused feature, and a label corresponding to the video is predicted based on the fused feature (for example, AGGN, film narration, popular science, or the like).

The foregoing application scenarios are only schematic examples, and the application scenarios of the classification and prediction method are not limited in the example of the present subject matter. In addition, the classification and prediction method may further be used in application scenarios such as image recognition, video analysis, nuclear analysis, and the like.

Figure 3:
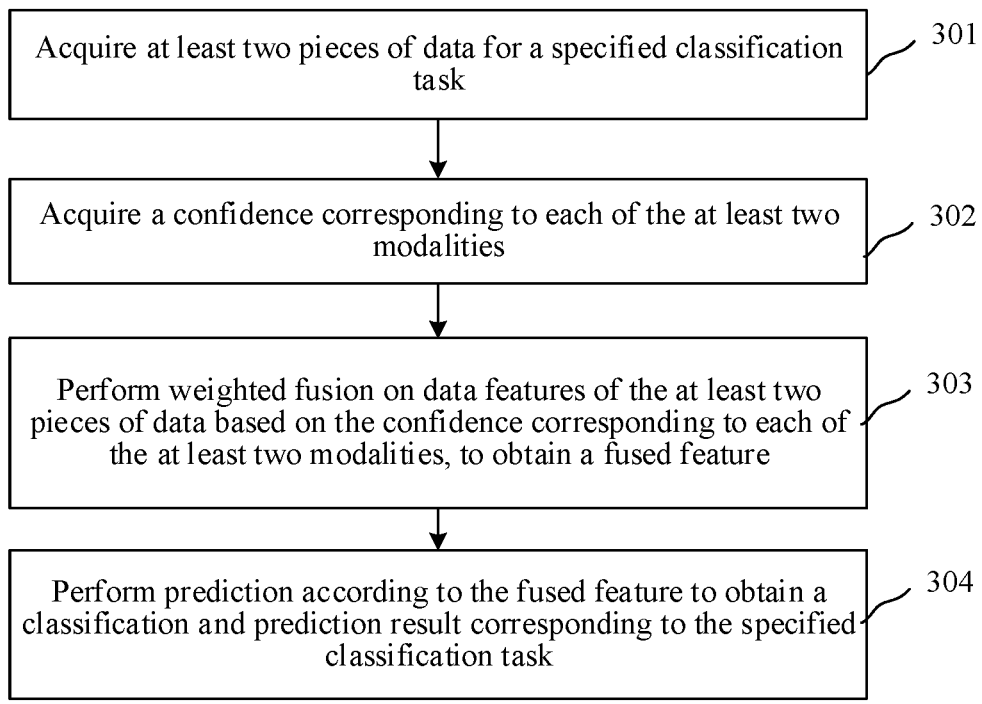
FIG. 3 is a flowchart of a classification and prediction method according to an example of the present subject matter.

For example, the classification and prediction method provided in the present subject matter is described. FIG. 3 is a flow chart of a classification and prediction method according to an example of the present subject matter. The method is performed by a computer device, and the computer device may be implemented as a server or a terminal. The method includes the following steps.

Step 301: Acquire at least two pieces of data for a specified classification task.

The at least two pieces of data correspond to at least two modalities, and each piece of data corresponds to one modality.

For example, a specified classification task is a task used for determining a classification result corresponding to input data.

Optionally, a manner of determining the specified classification task includes at least one of the following manners.

1. At least one classification result is preset in the specified classification task, and a classification and prediction result generated correspondingly according to the input data is matched with the classification result in the specified classification task, that is, the specified classification task is a category matching task.

2. The classification and prediction result generated by the input data is the classification result corresponding to the specified classification task, that is, the specified classification task is a task for classifying the input data to obtain the classification result.

The foregoing determination manner for the specified classification task is only a schematic example, which is not limited in the example of the present subject matter.

For example, specified data is acquired for the specified classification task, that is, different data is acquired for different specified classification tasks. For example, for stage determination of tumor tissue, gene sequence data, tumor image data, and data corresponding to tumor cell structure included in tumor tissue are acquired, and for prediction of a weather condition, a wind speed value, an amount of precipitation, a wind speed magnitude, a solar altitude angle, and a temperature value corresponding to the weather are acquired, which are not limited herein.

In some examples, data of the same data type is one modality, that is, the data in one modality is of the same data type. For example, for the stage determination of breast cancer tumor tissue, transcription data corresponding to mRNA transcriptomics in tumor tissue is acquired as a modality, methylation data corresponding to DNA genomics is acquired as a modality, and a tumor affect corresponding to tumor tissue is acquired as a modality. For example, a plurality of modalities include modalities of the same omics type but different data types (such as mRNA transcriptomics and DNA genomics), or the plurality of modalities include different types (such as gene sequences and medical images) of modalities, which is not limited herein.

It may be understood that the specific example of the present subject matter relates to related data such as at least two pieces of data in the specified classification task. User permission or consent needs to be obtained when the foregoing examples of the present subject matter are applied to specific products or technologies, and the collection, use, and processing of related data need to comply with relevant laws, regulations, and standards of relevant countries and regions.

For example, one piece of data corresponds to only one modality, that is, the data contained in the modalities in the same specified classification task is different.

Step 302: Acquire a confidence corresponding to each of the at least two modalities.

The confidence indicates a classification and prediction probability of the modality in the specified classification task.

In some examples, the confidence corresponding to the modality is the accuracy of classification and prediction of the modality for the specified classification task. For example, if a modality 1 performs classification and prediction for the specified classification task with a probability of 90% of obtaining a correct result, the confidence corresponding to the modality 1 is 0.9.

For example, a manner of determining the confidence corresponding to the modality includes at least one of the following manners.

1. The confidence corresponding to the current modality is determined according to a historical prediction classification result corresponding to each historical modality under the specified classification task. For example, during historical classification and prediction, if the prediction accuracy corresponding to historical data in the modality 1 is 95%, the confidence corresponding to the current modality 1 is determined as 0.95.
2. A confidence prediction network is set, and data in each modality is inputted into the confidence prediction network to determine the confidence corresponding to each modality.

The manner of determining the current confidence is only a schematic example, which is not limited in the example of the present subject matter.

For example, each modality has a confidence for the specified classification task, and the confidences corresponding to a plurality of corresponding modalities for the specified classification task are the same or different, which is not limited herein.

Step 303: Perform weighted fusion on data features of the at least two pieces of data based on the confidence corresponding to each of the at least two modalities, to obtain a fused feature.

For example, after the data for the specified classification task is acquired, data features corresponding to the data are extracted. For example, when the data is image data, pixel point distribution of image data is extracted as the data feature; when the data is gene sequence data, a gene sequence relationship is extracted as the data feature; and when the data is video data, a video frame of video data is extracted as the data feature, which is not limited herein.

Optionally, a manner of determining the fused feature includes at least one of the following manners.
1. Confidences corresponding to modalities are used as weights corresponding to data in the modalities, and a weighted sum/weighted average sum of data features corresponding to the data in the modalities with the corresponding weights is calculated, to obtain a fused feature.
2. Confidences corresponding to modalities are used as weights corresponding to data in the modalities, and product results of data features corresponding to the data in the modalities and the corresponding weights thereof are spliced, to obtain a fused feature.
3. A fusion feature network is established, and the data features corresponding to the data in each modality and the confidence corresponding to the modality are inputted into the fusion feature network, to obtain a fused feature.
4. First, the data features corresponding to data in a single modality are fused to obtain a data fusion result, the confidence corresponding to the modality is the corresponding weight of the data fusion result, and a weighted sum/weighted average sum of the data fusion results corresponding to a plurality of modalities is calculated to obtain a final fused feature.
5. A multi-layer neural network is constructed to fuse the confidence corresponding to each modality with the data features corresponding to the data in each modality, to obtain a fused feature.

The foregoing determination manner for the fused feature is only a schematic example, which is not limited in the example of the present subject matter.

Step 304: Perform prediction according to the fused feature to obtain a classification and prediction result corresponding to the specified classification task.

For example, at least one classification result is preset for a target classification and task, a prediction result is acquired by performing prediction according to the fused feature, the prediction result is matched with the classification result, and the classification result successfully matched with the prediction result is the classification and prediction result corresponding to the specified classification task.

The foregoing determination manner for the classification and prediction result is only a schematic example, which is not limited in the example of the present subject matter.

Optionally, a manner of performing prediction according to the fused feature includes at least one of the following manners.
1. A prediction label is set, and the fused feature is matched with the prediction label. The prediction label that can be matched with the fused feature is the prediction result of the fused feature, that is, the prediction manner is a label matching manner.
2. Correlation analysis is performed on the fused feature and the specified classification task, and the prediction result of the fused feature is determined according to the correlation analysis result, that is, the prediction manner is the correlation analysis. For example, a fused feature is a corresponding feature of tumor tissue, and a specified classification task is a task of classifying different subtypes of a tumor. A correlation analysis model is established, the fused feature and the specified classification task are inputted into the correlation analysis model for correlation analysis, and the tumor subtype with the highest correlation with the fused feature is selected as a determination result of the tumor subtype corresponding to the fused feature.

The foregoing prediction manner for the fused feature is only a schematic example, which is not limited in the example of the present subject matter.

Based on the above, the present subject matter provides a classification and prediction method. A confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

In the medical field, different disease grades corresponding to the same disease are regarded as a specified classification task, and different pathological parameters that determine results of disease grades correspond to different modalities. The same kind of pathological parameters are used as the data included in the same modality, and the confidence corresponding to each modality is determined by introducing a confidence. Based on the confidence corresponding to each modality, weighted fusion is performed on the data features corresponding to the data in each modality to obtain a fused feature, and the disease grade result is determined according to the fused feature, which is suitable for improving the accuracy of making personal medical plans for patients under precise medical care.

Figure 4:
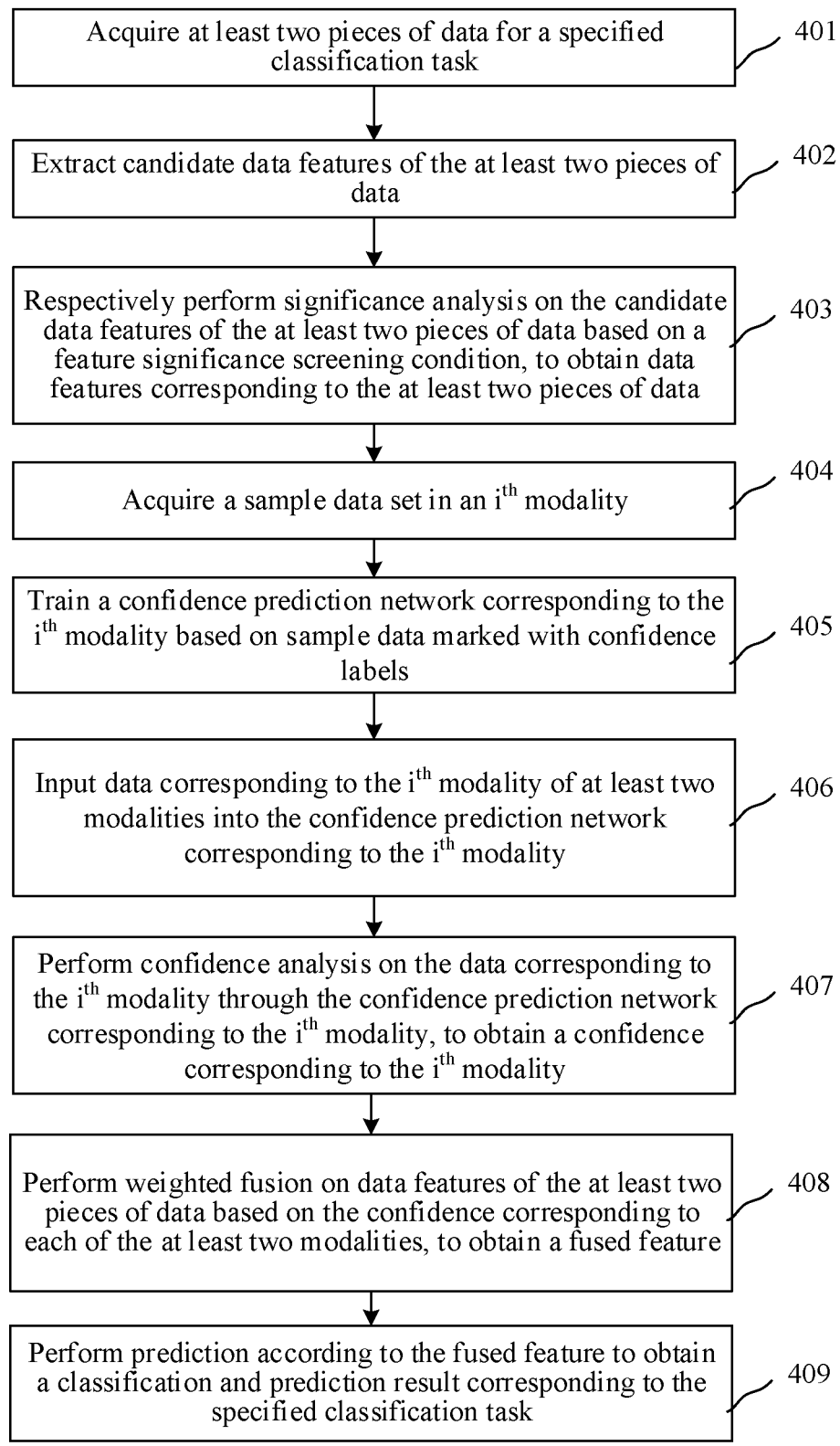
FIG. 4 is a flowchart of a classification and prediction method according to another example of the present subject matter.

In an example, the confidence corresponding to the modality is acquired through the confidence prediction network. For example, FIG. 4 is a flowchart of a classification and prediction method according to an example of the present subject matter. As shown in FIG. 4, the method includes the following steps.

Step 401: Acquire at least two pieces of data for a specified classification task.

The at least two pieces of data correspond to at least two modalities, and each piece of data corresponds to one modality.

The content about the specified classification task in step 401 has been described in detail in step 301, and details are not described herein again.

Step 402: Extract candidate data features of the at least two pieces of data.

Optionally, one piece of data includes one data feature or a plurality of data features. When one piece of data corresponds to a plurality of candidate data features, the plurality of candidate data features are screened, which is not limited herein.

For example, candidate data features corresponding to the at least two pieces of data are extracted by constructing a feature extraction network.

Step 403: Respectively perform significance analysis on the candidate data features of the at least two pieces of data based on a feature significance screening condition, to obtain the data features corresponding to the at least two pieces of data.

In some examples, a manner of determining significance analysis includes at least one of the following manners.
1. At least one significance screening condition is preset, and the candidate data features of at least two pieces of data are matched with the significance screening condition for significance analysis.
2. A pre-trained significance prediction network is set, and the candidate data features of at least two pieces of data are inputted into the significance prediction network for significance analysis.

The foregoing determination manner for the significance analysis is only a schematic example, which is not limited in the example of the present subject matter.

The training process of the significance prediction network is to be described in detail in the following examples, which is not described herein.

Step 404: Acquire a sample data set in an $i^{th}$ modality.

The sample data set includes sample data marked with a confidence label.

In some examples, initial classification and prediction are performed on the sample data to obtain an initial classification and prediction result corresponding to the sample data. The classification label is expressed in a one-hot encoding form to obtain a one-hot encoding vector, the classification label corresponding to the sample data having a first value, and other classification labels having a second value. The confidence label corresponding to the sample data is determined based on the initial prediction classification result and the one-hot encoding vector.

For example, the one-hot encoding vector is a vector corresponding to one-hot encoding. One-hot encoding, also referred to as one bit active encoding, is used by encoding N states by an N-bit state register, where each state is assigned an independent register bit, and only one bit is active in the states. In this example, for example, when a classification label corresponding to the sample data is 1, other classification labels are 0, that is, 1 is an active value and 0 is an inactive value in the one-hot encoding.

That is to say, since a number of categories is certain, the classification label is encoded by one-hot encoding, so that an encoding representation corresponding to the classification label can be quickly generated, and a device consumes fewer computing resources, thereby improving the training efficiency of the network.

For example, the confidence corresponding to the modality is determined by the confidence prediction network. Therefore, it is necessary to train the confidence prediction network. A manner of setting the confidence prediction network includes at least one of the following manners.
1. A confidence prediction network corresponding to each of a plurality of modalities is set. That is to say, each modality corresponds to a specified confidence prediction network, and the confidence prediction network corresponding to each modality has a same structure/different structures.
2. One confidence prediction network is set for the plurality of modalities, and parameters in the confidence prediction network are trained respectively after data corresponding to the modalities is inputted into the confidence prediction network.

The foregoing setting manner for the confidence prediction network is only a schematic example, which is not limited in the example of the present subject matter.

The confidence prediction network is trained by acquiring sample data marked with confidence labels. Optionally, the confidence label corresponding to each piece of sample data in the same modality is the same or different, which is not limited herein.

For example, the acquired sample data set in the same modality includes sample data from different samples, and a case that data quality corresponding to different sample data in the same modality is different exists. Different modalities of the same specified classification task have different impact on the classification and prediction results. Therefore, a confidence prediction network is set up to dynamically adjust quality changes between different sample data in each modality.

A confidence label corresponding to the sample data is determined by using a True Class Probability (TCP) value. For example, for the determination manner of the TCP value, reference is made to Formula I.

$$TCP^m = y \cdot p^m \qquad \text{Formula I}$$

$TCP^m$ represents a confidence label corresponding to an $m^{th}$ modality, y represents a classification label vector expressed in the form of one-hot encoding, and $p^m$ represents an initial prediction classification result corresponding to the $m^{th}$ modality.

The classification label vector is the classification label expressed in the form of a vector which is pre-marked by the sample data, and the classification label vector is known during acquisition of the sample data. For example, sample data A in a first modality is data corresponding to breast cancer stage I, and breast cancer includes breast cancer stage I, breast cancer stage II, breast cancer stage III, and breast cancer stage IV. Therefore, the classification label vector of sample data A corresponding to breast cancer stage I is 1, that is, a first value, and the respective classification label vectors corresponding to breast cancer stage II, breast cancer stage III, and breast cancer stage IV are all 0, that is, a second value. Optionally, the classification label vector is pre-marked during acquisition of the sample data is obtained, or the classification label vector in the form of one-hot encoding is obtained by manually marking the classification label after the sample data with the classification label is acquired, which is not limited herein.

For example, after the sample data is acquired, an initial classification and prediction network is constructed to perform classification and prediction on the sample data, and an initial classification and prediction result corresponding to the sample data is outputted by using the Softmax function. For example, sample data A is acquired and inputted into the initial classification and prediction network for classification and prediction, and a prediction result corresponding to sample data A is outputted by using the Softmax function. When the prediction results corresponding to sample data A are correspondingly a probability of 80% of breast cancer stage I, a probability of 5% of breast cancer stage II, a probability of 5% of breast cancer stage III, and a probability of 10% of breast cancer stage IV, the four prediction results are used as the initial classification and prediction results corresponding to sample data A. If the classification label of the sample data A is breast cancer stage I, a confidence corresponding to the sample data A is 0.8 according to the TCP mechanism, and if the classification label of the sample data A is breast cancer stage III, the confidence corresponding to the sample data A is 0.1 according to the TCP mechanism.

Optionally, after the confidences respectively corresponding to the sample data in the same modality in the sample data set are determined through the TCP mechanism, a result obtained by calculating a weighted sum/weighted average/ using the corresponding maximum value of the confidences corresponding to the sample data in the modality is the confidence label corresponding to the sample data in the modality. For example, a modality 1 includes three pieces of sample data. A confidence corresponding to sample data 1 is 0.8, a confidence corresponding to sample data 2 is 0.1, and a confidence corresponding to sample data 3 is 0.1. It may be learned by using the maximum value of the confidences that the confidence label corresponding to the modality 1 is 0.8.

Determining the confidence label corresponding to the sample data through the TCP value may lead to a small TCP value corresponding to the sample data and have less impact on the training of the confidence prediction network in a case that the initial classification result goes wrong.

In the training process, the confidence prediction network is trained by determining the confidence of the sample data and determining the confidence label of the modality. During the application, data in the modality is inputted into the confidence prediction network to determine the confidence corresponding to the modality.

Step 405: Train a confidence prediction network corresponding to the $i^{th}$ modality based on the sample data marked with the confidence label.

For example, after the confidence label corresponding to the sample data is acquired, the sample data marked with the confidence label is inputted into a confidence prediction network corresponding to the $i^{th}$ modality, to obtain a confidence corresponding to the $i^{th}$ modality and adjust parameters of the confidence prediction network. The adjustment manner includes determining a loss value between the confidence corresponding to the $i^{th}$ modality and the confidence label corresponding to the $i^{th}$ modality, the parameter of the confidence prediction network is adjusted based on the loss value, and the confidence prediction network is optimized. Optionally, the loss value is determined by a minimum absolute value deviation function (L1 loss function) or by a cross-entropy loss function, which is not limited herein.

Optionally, in a modality, a single adjustment or an iteration adjustment is performed on the parameter of the confidence prediction network corresponding to the modality, which is not limited herein.

Step 406: Input data corresponding to an $i^{th}$ modality of at least two modalities into the confidence prediction network corresponding to the $i^{th}$ modality.

The confidence prediction network is a pre-trained network configured to perform confidence analysis, and i is a positive integer.

In some examples, upon completion of training of the confidence prediction network corresponding to the $i^{th}$ modality through the sample data corresponding to the $i^{th}$ modality, in the application stage, the data corresponding to the $i^{th}$ modality is inputted into the confidence prediction network corresponding to the $i^{th}$ modality. Optionally, data in the $i^{th}$ modality is inputted into the confidence prediction network corresponding to the $i^{th}$ modality in sequence, or the data in the $i^{th}$ modality is simultaneously inputted into the confidence prediction network corresponding to the $i^{th}$ modality, which is not limited herein.

Step 407: Perform confidence analysis on the data corresponding to the $i^{th}$ modality through the confidence prediction network corresponding to the $i^{th}$ modality, to obtain a confidence corresponding to the $i^{th}$ modality.

In some examples, the confidence analysis is performed on the data corresponding to the $i^{th}$ modality through the confidence prediction network corresponding to the $i^{th}$ modality, to obtain a confidence analysis result corresponding to the $i^{th}$ modality. The confidence analysis result is mapped to [0, 1] through an activation function (sigmoid function) to obtain a mapping value corresponding to the confidence analysis result, and the mapping value is determined as the confidence corresponding to the $i^{th}$ modality.

Step 408: Perform weighted fusion on data features of the at least two pieces of data based on the confidence corresponding to each of the at least two modalities, to obtain a fused feature.

In some examples, product results of the data features corresponding to the at least two pieces of data for a specified classification task and the confidence of a respective corresponding modality are used as modality results corresponding to the modalities, and the modality results are spliced and inputted into a multi-layer neural network, to obtain a fused feature.

Step 409: Perform prediction according to the fused feature to obtain a classification and prediction result corresponding to the specified classification task.

The content about the classification and prediction result in step 409 has been described in detail in step 404, and details are not described herein again.

Based on the above, the present subject matter provides a classification and prediction method. A confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

In the medical field, different disease grades corresponding to the same disease are regarded as a specified classification task, and different pathological parameters that determine results of disease grades correspond to different modalities. The same kind of pathological parameters are used as the data included in the same modality, and the confidence corresponding to each modality is determined by introducing a confidence. Based on the confidence corresponding to each modality, weighted fusion is performed on the data features corresponding to the data in each modality to obtain a fused feature, and the disease grade result is determined according to the fused feature, which is suitable for improving the accuracy of making personal medical plans for patients under precise medical care.

In this example, the confidence corresponding to each of a plurality of modalities is determined by constructing a confidence prediction network, and during training of the confidence prediction network, the confidence prediction network is trained by using TCP mechanism to determine the confidence label corresponding to the sample data. The introduction of the confidence prediction network can cause different modalities to correspond to different confidences, which avoids the error of the classification and prediction result caused by the modality with a higher confidence when the classification and prediction is wrong.

In the medical field, by constructing a confidence prediction network, during analysis of different grades of pathology under the same disease, for example, a pathology grade of tumor is analyzed to determine a confidence corresponding to each pathology grade, which may be used for analyzing results of auxiliary pathological analysis, so as to improve the accuracy of pathological grading analysis and implement precise medical treatment.

Figure 5:
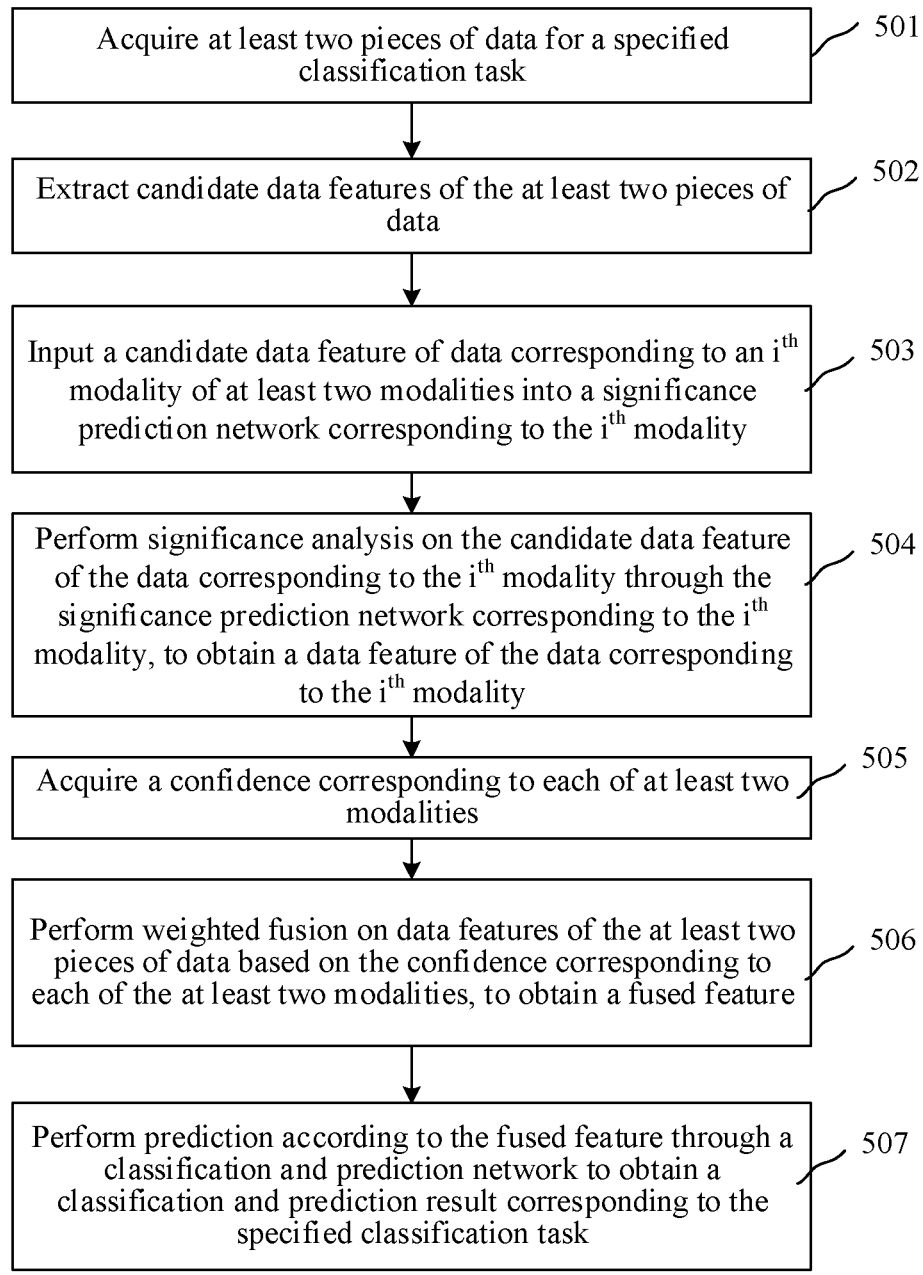
FIG. 5 is a flowchart of a classification and prediction method according to another example of the present subject matter.

In an example, the classification and prediction method further includes performing significance analysis on candidate data features corresponding to input data by setting a pre-trained significance prediction network. For example, FIG. 5 is a flowchart of a classification and prediction method according to an example of the present subject matter. As shown in FIG. 5, the method includes the following steps.

Step 501: Acquire at least two pieces of data for a specified classification task.

The at least two pieces of data correspond to at least two modalities, and each piece of data corresponds to one modality.

The specified classification task in step 501 has been described in detail in step 301, and details are not described herein again.

Step 502: Extract candidate data features of the at least two pieces of data.

For example, by constructing a pre-trained feature extraction network, at least two pieces of data are inputted into the feature extraction network to extract candidate data features corresponding to the at least two pieces of data.

Optionally, a specified feature extraction network is correspondingly constructed for each modality, and data in each modality is inputted into the specified feature extraction network corresponding to the modality to extract candidate data features. Alternatively, only one feature extraction network is set for each modality under the same specified classification task, that is, the data in each modality is inputted into the feature extraction network to extract the candidate data feature corresponding to each piece of data, which is not limited herein.

Optionally, the data in each modality is inputted into the feature extraction network in sequence to extract the candidate data feature, or the data in each modality is simultaneously inputted into the feature extraction network to extract the candidate data feature, which is not limited herein.

Step 503: Input a candidate data feature of data corresponding to an $i^{th}$ modality of at least two modalities into a significance prediction network corresponding to the $i^{th}$ modality.

The significance prediction network is a pre-trained network configured to perform significance analysis, and i is a positive integer.

Optionally, a specified significance prediction network is correspondingly set in each modality, that is, the candidate data features corresponding to the data in the $i^{th}$ modality are inputted into the significance prediction network corresponding to the $i^{th}$ modality for significance analysis. Alternatively, one significance prediction network is correspondingly set in each modality. The candidate data features corresponding to the data in each modality are all inputted into the significance prediction network for significance analysis, which is not limited herein. In this example, one specified significance prediction network is correspondingly set in each modality is an example for description. The significance prediction networks corresponding to the modalities have a same structure or different structures, which is not limited herein.

Optionally, the candidate data features corresponding to the data in the $i^{th}$ modality are inputted into the significance prediction network in sequence for significance analysis. Alternatively, the candidate data features corresponding to the data in the $i^{th}$ modality are simultaneously inputted into the significance prediction network for significance analysis, which is not limited herein.

For example, the significance prediction network is configured to assign a same significance score/different significance scores to the candidate data features corresponding to the data inputted in the same modality as the corresponding results of significance analysis.

Step 504: Perform the significance analysis on the candidate data feature of the data corresponding to the $i^{th}$ modality through the significance prediction network corresponding to the $i^{th}$ modality, to obtain a data feature of the data corresponding to the $i^{th}$ modality.

In some examples, the significance analysis is performed on the candidate data feature of the data corresponding to the $i^{th}$ modality through the significance prediction network corresponding to the $i^{th}$ modality, to obtain a significance score of the candidate data feature of the data corresponding to the $i^{th}$ modality. The data feature of the data corresponding to the $i^{th}$ modality is obtained based on the significance score and the candidate data feature of the data corresponding to the $i^{th}$ modality.

For example, significance analysis is performed on the candidate data feature inputted into the significance prediction network to obtain a significance analysis result corresponding to the candidate data feature, the significance analysis result corresponding to the candidate data feature is mapped as a value falling within [0, 1] through the activation function, and the value is the significance score corresponding to the candidate data feature.

Optionally, a manner of determining the data feature includes at least one of the following manners.

1. A gating threshold is preset, the candidate data feature corresponding to each piece of data in the same modality whose corresponding significance score is less than the gating threshold is filtered, and the candidate data feature whose significance score is greater than the gating threshold is retained as the data feature of the data.

2. A gating threshold is preset, a weighted average sum of the significance scores corresponding to the candidate data features corresponding to the data in the same modality is calculated to obtain an average significance score corresponding to each piece of data, and the candidate data feature whose significance score is greater than the average significance score is selected as the data feature corresponding to the data.

The foregoing determination manner for the data feature is only a schematic example, which is not limited in the example of the present subject matter.

For example, the candidate data feature of the data corresponding to the $i^{th}$ modality includes at least two feature elements, and therefore the significance score includes significance sub-scores respectively corresponding to the at least two feature elements.

In some examples, the feature element whose significance sub-score reaches a preset gating threshold among at least two feature elements is determined as the data feature of the data corresponding to the $i^{th}$ modality, that is, the feature element whose significance sub-score is less than the preset gating threshold among at least two feature elements is filtered, and the feature element whose significance sub-score reaches the preset gating threshold among at least two feature elements is retained.

For example, when the data corresponding to the $i^{th}$ modality is image data, a candidate data feature corresponding to the image data is a pixel point distribution corresponding to an image, and a distribution position of each pixel point in the image is a coordinate point. Therefore, each coordinate element in the coordinate point corresponding to the pixel point is a feature element corresponding to the image data. During the significance analysis, each coordinate element corresponding to the pixel point is inputted into the significance prediction network for significance analysis, and the significance analysis result corresponding to each coordinate element corresponding to the pixel point is obtained. The significance analysis result is mapped as a value falling within [0,1] through an activation function, and the value correspondingly output by each coordinate element is the significance sub-score corresponding to each coordinate element. That is, the significance sub-score of each coordinate element corresponds to the pixel point of the data image in the same modality. The coordinate element less than the preset gating threshold is filtered. Only the coordinate element greater than the gating threshold is retained. The pixel point corresponding to the coordinate element that is greater than the gating threshold is the data feature corresponding to the image data.

For example, in a case that coordinates corresponding to a pixel point include a plurality of coordinate elements, and all coordinate elements of the pixel point are greater than the gating threshold, the pixel point is the data feature of the image data.

Optionally, when a candidate data feature corresponding to a piece of data includes a plurality of feature elements, the feature elements are inputted into the significance prediction network for significance analysis, to obtain significance sub-scores corresponding to the feature elements. A corresponding weighted sum/weighted average sum/average/sum of the significance sub-scores corresponding to the feature elements in the same candidate data feature is the significance score corresponding to the candidate data feature, which is not limited herein.

That is to say, a plurality of feature elements corresponding to the data are screened by using the preset gating threshold, so as to retain the feature element with high significance, thereby reducing the feature dimension for further processing while reducing the impact of the feature element with low significance on classification and prediction, and reducing computing resource consumption during computing by a device.

Step 505: Acquire a confidence corresponding to each of the at least two modalities.

The confidence indicates a classification and prediction probability of the modality in the specified classification task.

The content about the confidence in step 505 has been described in detail in step 304, and details are not described herein again.

Step 506: Perform weighted fusion on data features of the at least two pieces of data based on the confidence corresponding to each of the at least two modalities, to obtain a fused feature.

After the data features corresponding to the at least two pieces of data are acquired through the significance prediction network, the data features are inputted into a deep feature extraction network preset in advance, deep semantic features corresponding to the data features are extracted, the deep semantic features corresponding to the data are multiplied with a confidence corresponding to each modality to obtain a modality result corresponding to the modality, and the modality results are spliced and inputted into a multi-layer feature network for weighted fusion to obtain a final fused feature.

Step 507: Perform prediction according to the fused feature through a classification and prediction network to obtain a classification and prediction result corresponding to the specified classification task.

Classification and prediction are performed according to the fused feature that belongs to the pre-trained classification and prediction network, to obtain the classification and prediction result corresponding to the specified classification task.

Based on the above, the present subject matter provides a classification and prediction method. A confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

In the medical field, different disease grades corresponding to the same disease are regarded as a specified classification task, and different pathological parameters that determine results of disease grades correspond to different modalities. The same kind of pathological parameters are used as the data included in the same modality, and the confidence corresponding to each modality is determined by introducing a confidence. Based on the confidence corresponding to each modality, weighted fusion is performed on the data features corresponding to the data in each modality to obtain a fused feature, and the disease grade result is determined according to the fused feature, which is suitable for improving the accuracy of making personal medical plans for patients under precise medical care.

In this example, a corresponding significance score is determined for the candidate data feature corresponding to the data by setting a trained significance prediction network in advance. The data feature corresponding to the data is determined according to the significance score so that the candidate data feature with less impact (that is, significance) on the specified classification task can be filtered, and only the data feature with more impact on the specified classification task is retained, thereby improving the accuracy of classification and prediction and prediction efficiency and reducing the probability of feature redundancy.

In the medical field, since different kinds of parameters used for determining the grade results often have different influences on the analysis results during determination of the pathology grade, some parameters have small changes in different grades, and some parameters have great change in different grades. Therefore, the significance prediction network is introduced to filter significance of the data corresponding to different kinds of parameters and screen out the data feature with great influence on the pathology grade analysis result, thereby improving the accuracy of the pathology grade analysis and analysis efficiency.

Figure 6:
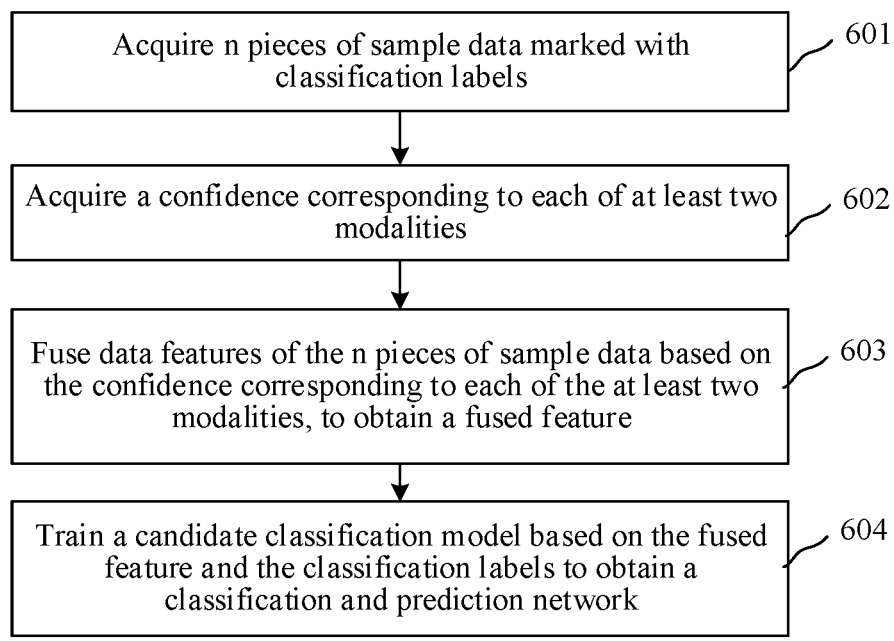
FIG. 6 is a flowchart of a classification and prediction method according to another example of the present subject matter.

In an example, the classification and prediction network further includes a corresponding training process. For example, FIG. 6 is a flowchart of a classification and prediction method according to an example of the present subject matter. According to the process, before the performing prediction according to the fused feature and obtaining the classification and prediction result corresponding to the specified classification task, the method mainly includes the following steps.

Step 601: Acquire n pieces of sample data marked with classification labels.

The n pieces of sample data correspond to the at least two modalities, each piece of sample data corresponding to one modality, and n is a positive integer.

In some examples, the classification label marked for each piece of the acquired n pieces of sample data is the classification result corresponding to each piece of sample data. For example, mRNA transcription data, DNA methylation data, and miRNA data included in tumor tissue of a patient with breast cancer stage I are acquired, and a corresponding classification label of the mRNA transcription data is "breast cancer stage I mRNA transcription data". However, the mRNA transcription data is correspondingly one modality.

Step 602: Acquire a confidence corresponding to each of the at least two modalities.

The confidence indicates a classification and prediction probability of the modality.

For example, TCP values respectively corresponding to the two modalities are determined by using the TCP mechanism, and the TCP values corresponding to the modalities are used as the confidences corresponding to the modalities. The training process of the TCP mechanism has been described in detail in step 404, and details are not described herein again.

Step 603: Fuse features of n pieces of sample data based on the confidences respectively corresponding to the at least two modalities, to obtain a fused feature.

For example, deep semantic features corresponding to n pieces of sample data are extracted through the feature extraction network, product results of the deep semantic features corresponding to the sample data and the confidences of the corresponding modalities are used as the corresponding modality results, and the modality results corresponding to at least two modalities are spliced and inputted into the multi-layer neural network for training to obtain a fused feature.

Step 604: Train a candidate classification model based on the fused feature and the classification labels to obtain a classification and prediction network.

For example, the candidate classification model is a model configured to determine the classification and prediction network.

In some examples, n pieces of sample data are respectively marked with classification labels. Classification and prediction are performed on the fused feature through the candidate classification model to obtain a classification and prediction result. A loss value corresponding to the candidate classification model is determined based on the classification and prediction result and the classification label. A model parameter of the candidate classification model is adjusted based on the loss value to obtain the classification and prediction network.

For example, the classification label marked for the sample data is encoded in the form of one-hot encoding.

For example, the loss value corresponding to the candidate classification model is determined through cross-entropy loss function according to the classification and prediction result and classification label. That is to say, the loss value corresponding to the candidate classification and prediction model is determined by an error between the classification and prediction result and the classification label, and the parameter corresponding to the candidate classification and prediction model is adjusted according to the loss value, so as to obtain the final classification and prediction network.

Figure 7:
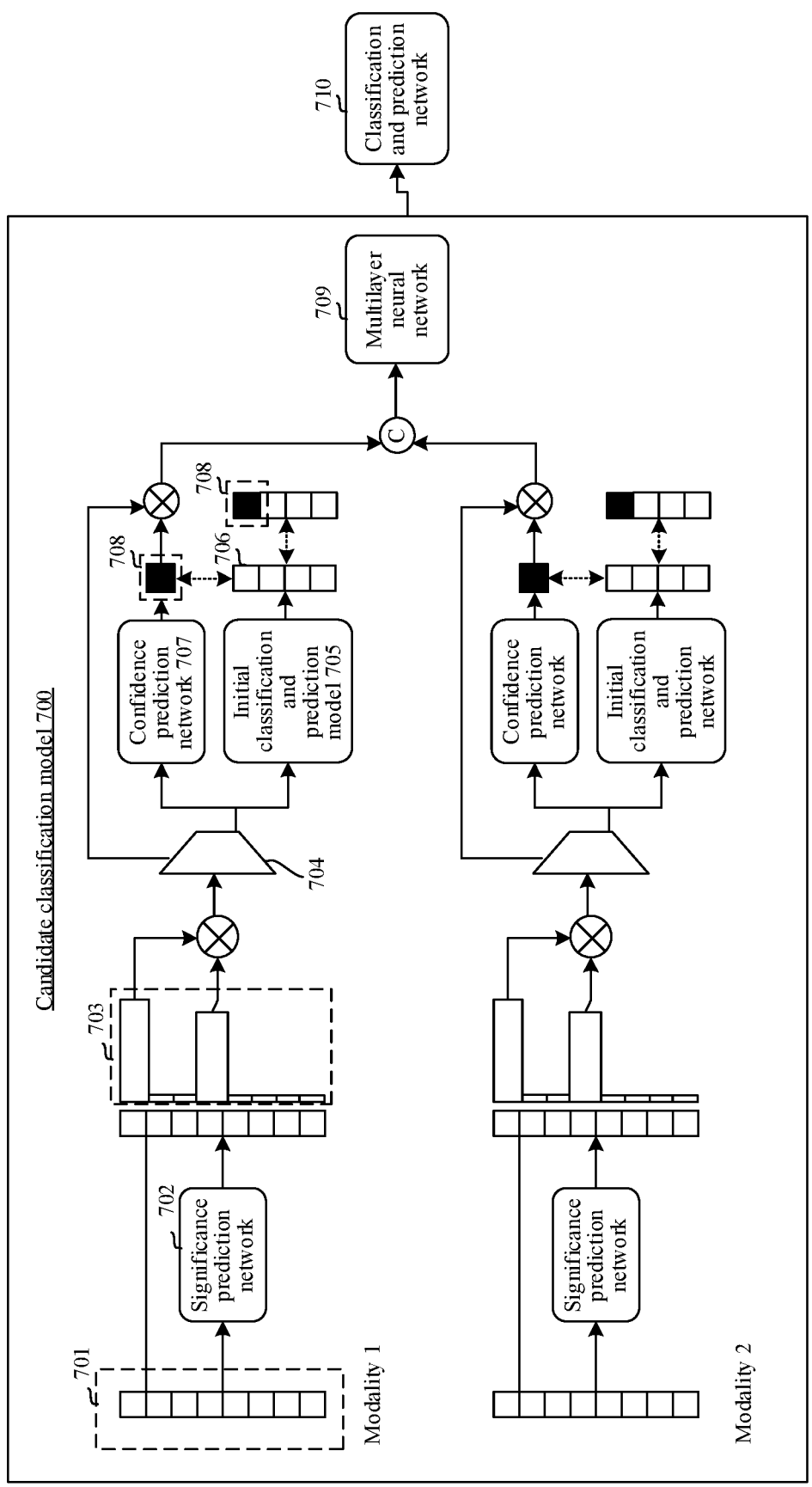
FIG. 7 is a schematic diagram of a classification and prediction method according to an example of the present subject matter.

For example, FIG. 7 is a schematic diagram of a classification and prediction method according to an example of the present subject matter. As shown in FIG. 7, a candidate classification model 700 is currently displayed, a sample classification task is set, and corresponding sample data sets in two modalities (a modality 1 and a modality 2) are acquired for the sample classification task. Since network structures in the modality 1 and the modality 2 are the same, the modality 1 is an example for description. The modality 1 includes a plurality of pieces of sample data 701. The sample data 701 correspondingly includes a plurality of candidate data features, and the sample data 701 is marked with classification labels. The sample data 701 is inputted into a pre-trained significance prediction network 702, the plurality of candidate data features correspondingly included in the sample data 701 are respectively multiplied with the significance prediction network 702, and the products are mapped to [0, 1] through an activation function, to obtain significance scores respectively corresponding to the plurality of candidate data features. In addition, in order to ensure the sparsity of the significance score distribution corresponding to the plurality of candidate data features, the loss value between the significance score and the candidate data feature is determined by using a loss function L1, and a significance score distribution 703 corresponding to the candidate data features is finally determined. The significance score less than the gating threshold is filtered through the gating threshold, and the significance score greater than the gating threshold is retained. The candidate data feature corresponding to the significance score is the data feature corresponding to the sample data, and the data feature is inputted into the feature extraction network to extract a deep semantic feature 704 corresponding to the data feature.

The sample data 701 is inputted into an initial classification and prediction model 705 to obtain an initial classification probability corresponding to the sample data 701, and a confidence 706 corresponding to the sample data is determined according to the classification label corresponding to the initial classification probability and the sample data 701. A confidence prediction network 707 corresponding to the modality 1 is constructed based on the confidence 706, and a confidence label 708 corresponding to the modality 1 is determined through the confidence prediction network 707. The product result of the deep semantic feature 704 corresponding to sample data 701 and the confidence label 708 is a modality result corresponding to the modality 1. The modality results corresponding to the modality 1 and the modality 2 are spliced and then inputted into a multi-layer neural network 709 for fusion to obtain a fused feature. The cross-entropy loss value is calculated according to the fused feature and the classification label and used as a loss function to train the candidate classification model, so as to finally obtain the classification and prediction network 710.

It may be understood that the specific example of the present subject matter relates to related data such as sample data. User permission or consent needs to be obtained when the foregoing examples of the present subject matter are applied to specific products or technologies, and the collection, use, and processing of related data need to comply with relevant laws, regulations, and standards of relevant countries and regions.

Based on the above, the present subject matter provides a classification and prediction method. A confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

In the medical field, different disease grades corresponding to the same disease are regarded as a specified classification task, and different pathological parameters that determine results of disease grades correspond to different modalities. The same kind of pathological parameters are used as the data included in the same modality, and the confidence corresponding to each modality is determined by introducing a confidence. Based on the confidence corresponding to each modality, weighted fusion is performed on the data features corresponding to the data in each modality to obtain a fused feature, and the disease grade result is determined according to the fused feature, which is suitable for improving the accuracy of making personal medical plans for patients under precise medical care.

In this example, by setting and training the significance prediction network for the candidate data feature and setting and training the confidence prediction network for the data feature of the data, a sufficient data feature with less contribution to the sample classification task can be screened out. In a case where a model outputs a classification result error, the influence on the accuracy of a final classification and prediction result is reduced based on the small confidence label.

In the medical field, during analysis of the pathology grade, by introducing the significance prediction network, inactive parameters with little influence on grading results can be accurately filtered, and data features corresponding to active parameters can be retained. In addition, by introducing the confidence prediction network, the prediction accuracy and prediction efficiency of confidences corresponding to different grades can be improved during the actual application by performing confidence prediction training for different grade situations.

Figure 8:
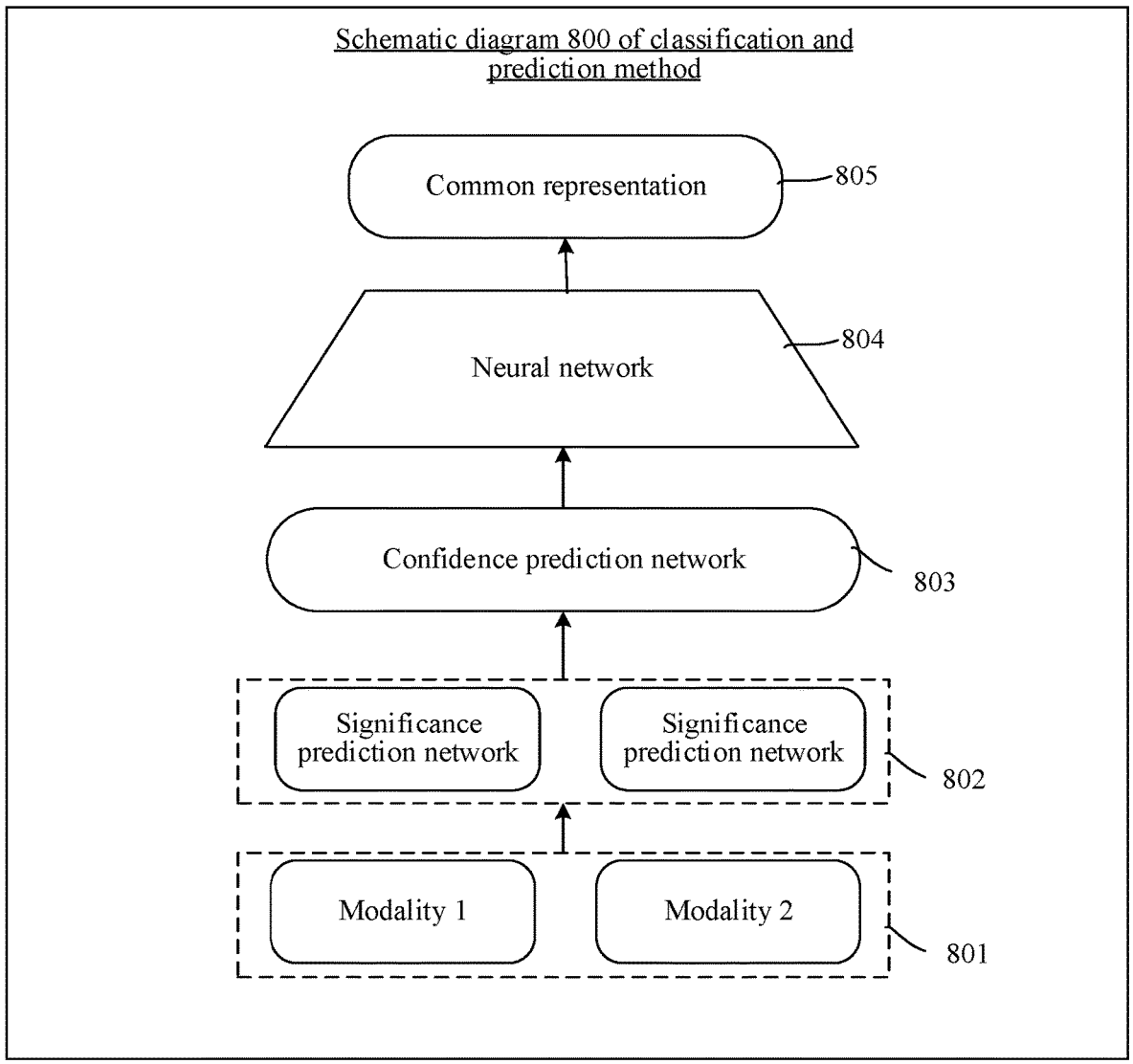
FIG. 8 is a schematic diagram of a classification and prediction method according to another example of the present subject matter.

For example, FIG. 8 is a schematic diagram of a classification and prediction method according to an example of the present subject matter. As shown in FIG. 8, target data respectively corresponding to at least two modalities 801 is acquired for a specified classification task, and a significance prediction network 802 is set based on candidate data features corresponding to the target data. Data features corresponding to the target data are determined based on the significance prediction network 802, and a confidence prediction network 803 is set. After the data features are inputted into the confidence prediction network 803, a confidence label corresponding to the data feature is acquired. Modality results corresponding to at least two modes 801 are determined according to the confidence label and the data feature, and the modality results corresponding to the at least two modalities 801 are jointly inputted into a multi-layer neural network 804 to obtain a fused feature. The fused feature is mapped to a public space to acquire a common representation 805 corresponding to the at least two modalities 801, and prediction analysis is performed on the common representation 805 and the specified classification task to determine a final classification and prediction result.

Precision medicine is targeted medication and design of treatment programs for different patients according to respective conditions. With the expansion of human observation means, a patient may be subjected to multi-parameter diagnosis and treatment from various levels such as a molecular level, a pathologic level, and an imaging level, to have an accurate understanding of an overall health condition of the patient and achieve accurate molecular subtyping and disease grading. Therefore, it is necessary to establish a multimodal fusion algorithm to establish a classification model for heterogeneous medical data from different sources. The types of medical data used in precision medicine include clinical genomics, clinical indicators, microscopic pathology, images, and the like. Genomics may be divided into genomics, transcriptomics, proteomics, metabonomics, and the like according to different detected substances. The images also include modalities such as X-ray, ultrasound, MRI, CT, and the like, and may further be subdivided into data from different angles and different channel sources. For a variety of medical data types, a relatively number of network skeletons have been provided currently for targeted processing. The processing of modality fusion is generally to perform weighted average on the prediction probability of each modality output to obtain the final prediction result.

In practical application, the data quality of different patients in the same modality is uneven, and the contribution of different modalities to the final prediction results is also different. The fusion of common multi-omics (mRNA, DNA methylation, and miRNA) is an example. The mRNA sequencing technology may be used to measure the mRNA transcription level of more than 20,000 genes in cells or tissue, which contains rich information, while the DNA methylation technology reflects whether DNA has been methylated. There are relatively few known DNA methylation sites, and the information dimension is relatively small and the mRNA transcription level is relatively low. miRNA may indirectly regulate the transcription level of genes. Therefore, when modality fusion is performed on the three data types of mRNA, DNA methylation, and miRNA from the same sample, information content, executed functions, and contribution to the results are different, and the existing fusion method does not explicitly consider this situation.

In addition, the correlation between internal features of each modality is also different. The transcription level of genes detected by mRNA is an example. The transcription level of some genes varies greatly in different types of tissues, which means that the genes include useful information for distinguishing between different types. However, house-keeping genes, such as actin and tubulin, have no obvious changes in most tissues, which is not helpful for classification. These two types of genes are to have different feature weights. Another example is proteome. Since the non-targeted protein spectrum cannot amplify the signal like a second-generation sequencer when detecting the signal, the quality of the obtained signal is affected by the abundance of the protein in the cell. The abundance of transcription factors is relatively low, even if a greater error caused by the unstable sequencing technology may be detected. For this low-quality feature, the significance of the feature level is to be flexibly evaluated according to the situation.

The solution of the present subject matter not only can ensure the reliability of the multimodal medical data fusion process, but also can improve the robustness of the model to data and the performance of the model because the multimodal feature fusion is guided based on a modality confidence and feature significance. The following is the effect comparison between the prior art and the present invention in the task of breast cancer molecular subtyping (Table 1). It can be seen that the performance of the present invention is significantly better than that of the prior art, and has higher stability.

TABLE 1

| Method name | Accuracy | F1 weight value | F1 macro value |
|---|---|---|---|
| k-nearest neighbor (KNN) | 74.2 ± 2.4 | 73.0 ± 2.5 | 68.2 ± 2.5 |
| Support Vector Machine (SVM) | 72.9 ± 1.8 | 70.2 ± 1.7 | 64.0 ± 1.7 |
| Linear regression (LR) | 73.2 ± 1.2 | 69.8 ± 2.6 | 64.2 ± 2.6 |
| Random forest (RF) | 75.4 ± 0.9 | 73.3 ± 1.3 | 64.9 ± 1.3 |
| Fully connected neural network (NN) | 75.4 ± 2.8 | 74.0 ± 4.7 | 66.8 ± 4.7 |
| Regularized logical regression (GRidge) | 74.5 ± 1.6 | 72.6 ± 2.5 | 65.6 ± 2.5 |
| Partial Least Squares Discriminant (BPLSDA) | 64.2 ± 0.9 | 53.4 ± 1.7 | 36.9 ± 1.7 |
| Graph Convolutional Network (MOGONET) | 63.9 ± 0.8 | 52.2 ± 2.2 | 35.1 ± 2.2 |
| This solution | 87.7 ± 0.3 | 88.0 ± 0.5 | 84.5 ± 0.5 |

Figure 10:
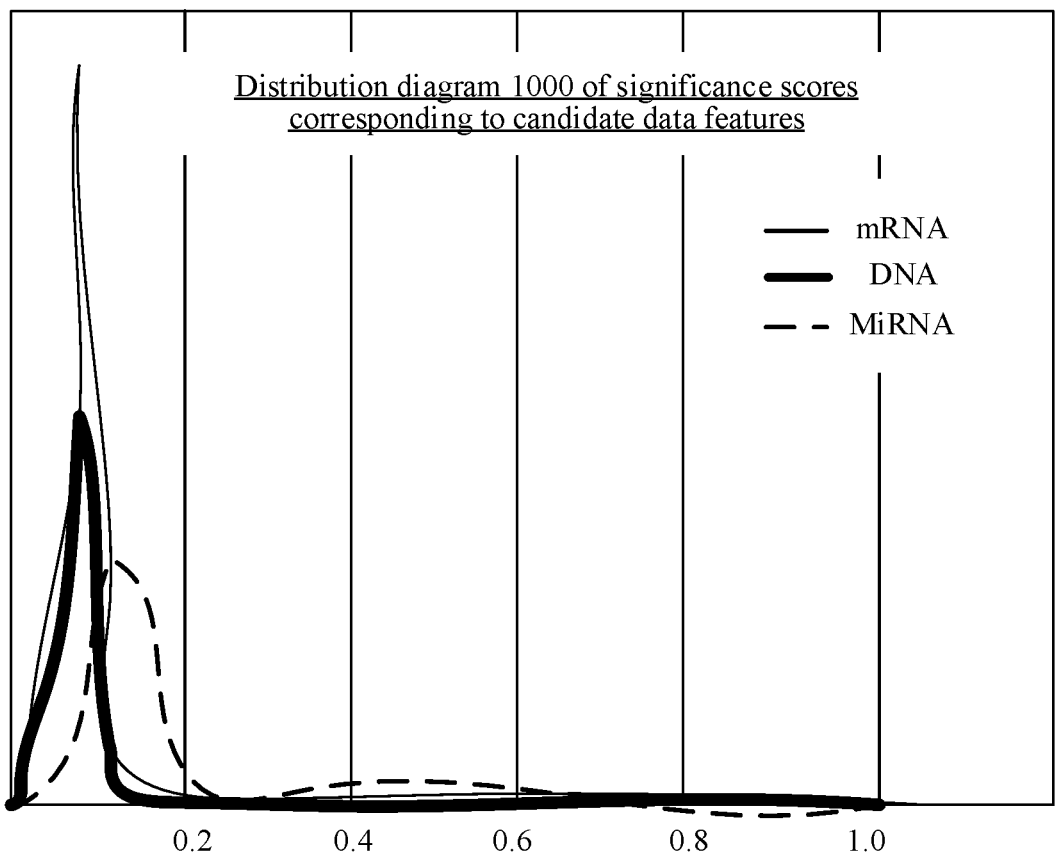
FIG. 10 is a distribution diagram of significance scores corresponding to candidate data features according to an example of the present subject matter.
Figure 11:
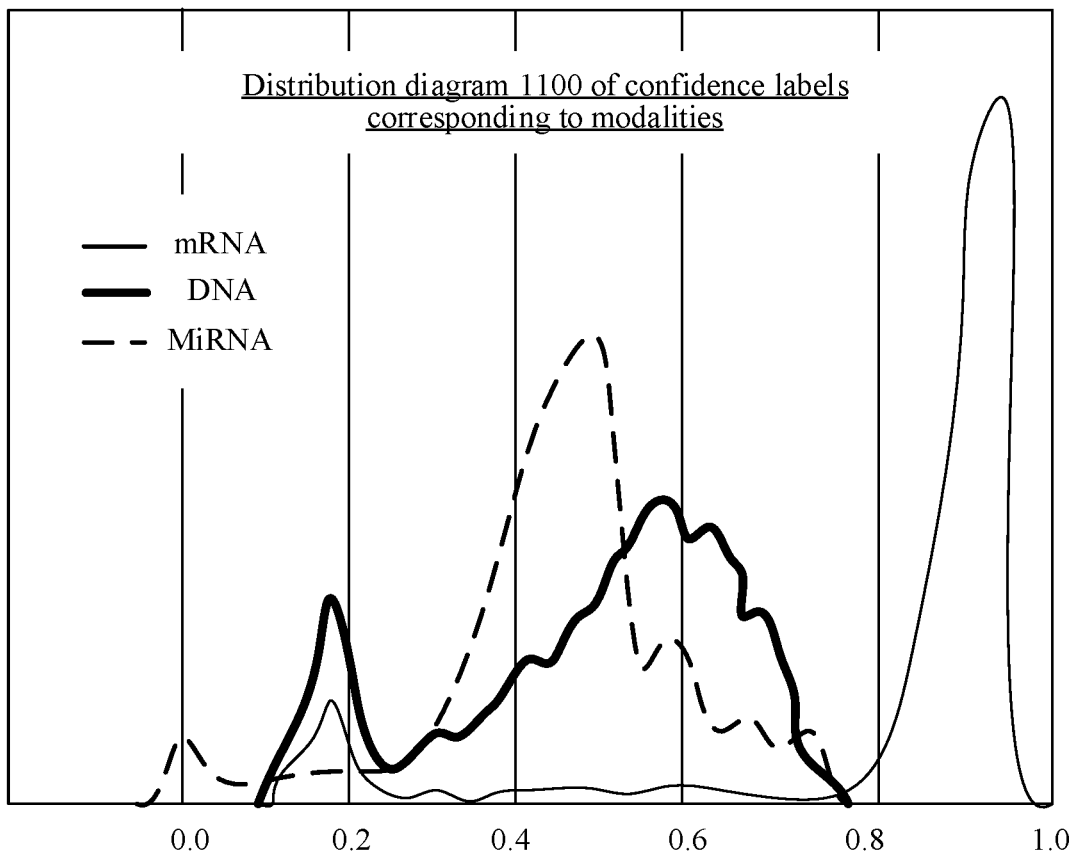
FIG. 11 is a distribution diagram of confidence labels corresponding to modalities according to another example of the present subject matter.

In order to verify the rationality of the fusion process of this solution, a qualitative verification experiment is performed, including: a statistical diagram of biomarker feature significance in different modalities (FIG. 9), a distribution diagram of significance scores corresponding to candidate data features (FIG. 10), and a distribution diagram of confidence labels corresponding to each modality (FIG. 11).

Figure 9:
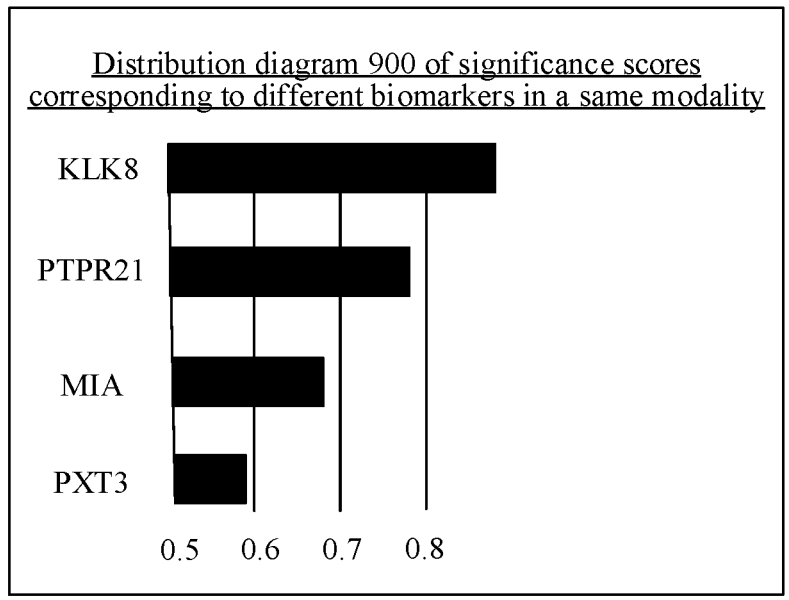
FIG. 9 is a statistical chart of biomarker feature significance in different modalities according to an example of the present subject matter.

As shown in FIG. 9, in the solution provided in the present subject matter, during a molecular subtyping task for breast cancer, the ability to find biomarkers (for example, KLK8, PTPR21, MIA, and PXT3) from omics data by a significance prediction network is of vital importance for early identification and treatment of a disease. A plurality of biomarkers found in the present subject matter can be mutually verified with the existing related research literature, which indicates the role of the proposed significance prediction network, and the significance scores of different markers are different in the same modality.

As shown in FIG. 10, the significance scores corresponding to candidate data features induced by sparse loss are mainly concentrated in an area close to 0, and only a small part of the significance scores are relatively high. The figure shows the rationality and effectiveness of the sparse loss adopted in the solution provided in the present subject matter.

As shown in FIG. 11, it may be seen from the distribution diagram of confidence labels provided in the solution provided in the present subject matter that, the same modality of different samples has different functions in the classification and prediction process. mRNA is an example. The modality significance of most samples is close to 1, but a small part of samples still has relatively low modality significance. This qualitatively verifies the rationality of the confidence prediction network adopted in the solution provided in the present subject matter.

The multilayer neural network involved in the present subject matter may further be replaced by more complex and advanced neural networks or added with some gainful modules, for example, replaced by variants as a network based on an attention mechanism, a network with residual connection, and the like.

In the examples provided in the present subject matter, mRNA, DNA methylation, and miRNA determination may be processed, and may further be used for input of modality data such as DNA mutation, histone detection, and chromosome recombination. All data is structured data and may be processed by using the same network skeleton.

The paradigm of multimodal fusion provided in the present subject matter is universal, not limited to the fusion of all kinds of omics data, and may further be applied to scenarios such as fusion of omics data and image data, fusion of pictures from different angles in image data, and the like.

Based on the above, the present subject matter provides a classification and prediction method. A confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

In the medical field, different disease grades corresponding to the same disease are regarded as a specified classification task, and different pathological parameters that determine results of disease grades correspond to different modalities. The same kind of pathological parameters are used as the data included in the same modality, and the confidence corresponding to each modality is determined by introducing a confidence. Based on the confidence corresponding to each modality, weighted fusion is performed on the data features corresponding to the data in each modality to obtain a fused feature, and the disease grade result is determined according to the fused feature, which is suitable for improving the accuracy of making personal medical plans for patients under precise medical care.

Figure 12:
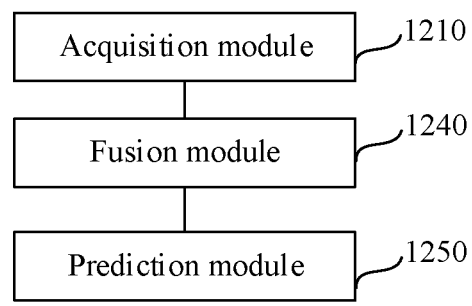
FIG. 12 is a structure diagram of a classification and prediction apparatus according to an example of the present subject matter.

FIG. 12 is a structural block diagram of a classification and prediction apparatus according to an example of the present subject matter. As shown in FIG. 12, the apparatus includes:

an acquisition module 1210, configured to acquire at least two pieces of data for a specified classification task, the at least two pieces of data corresponding to at least two modalities, each piece of data corresponding to one modality;

the acquisition module 1210 is further configured to acquire a confidence corresponding to each of the at least two modalities, the confidence indicates a classification and prediction probability of the modality in the specified classification task;

a fusion module 1240, configured to perform weighted fusion on data features of the at least two pieces of data based on the confidence corresponding to each of the at least two modalities, to obtain a fused feature; and a prediction module 1250, configured to perform prediction according to the fused feature to obtain a classification and prediction result corresponding to the specified classification task.

Figure 13:
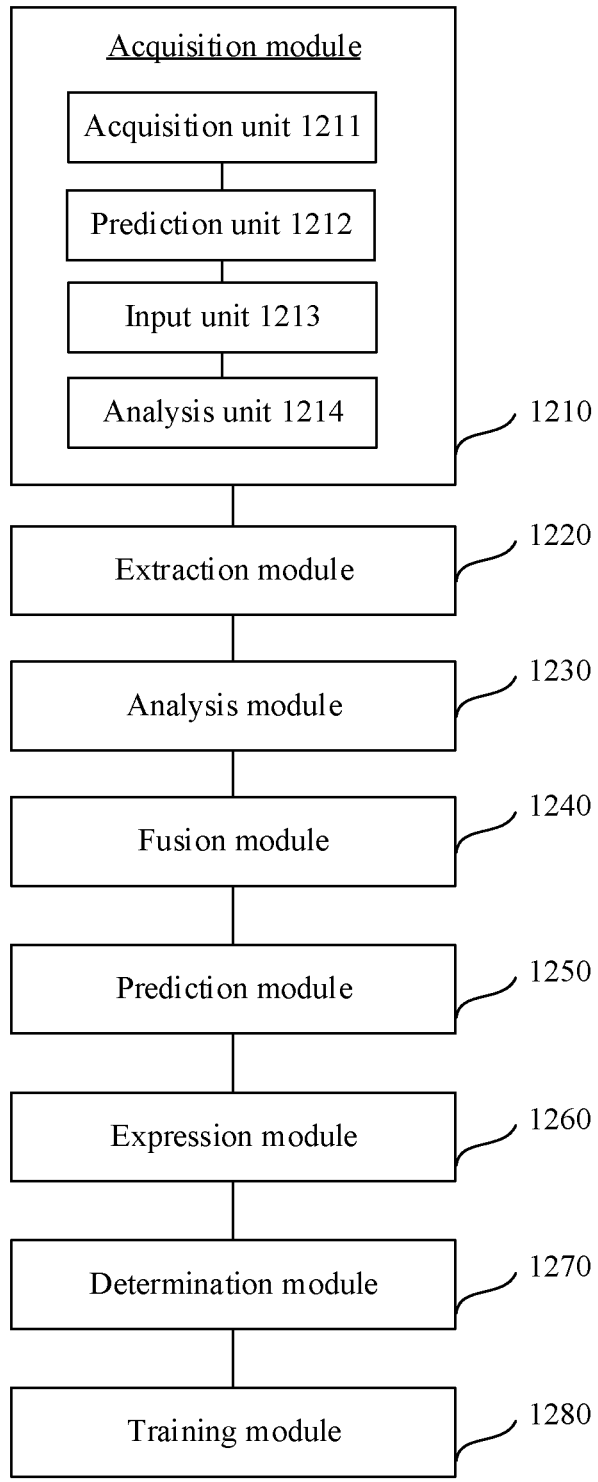
FIG. 13 is a structure diagram of a classification and prediction apparatus according to another example of the present subject matter.

In an example, as shown in FIG. 13, the acquisition module 1210 includes:

an input unit 1213, configured to input data corresponding to an $i^{th}$ modality of the at least two modalities into a confidence prediction network corresponding to the $i^{th}$ modality, the confidence prediction network is a pre-trained network configured to perform confidence analysis, and i is a positive integer; and an analysis unit 1214, configured to perform the confidence analysis on the data corresponding to the $i^{th}$ modality through the confidence prediction network corresponding to the $i^{th}$ modality, to obtain the confidence corresponding to the $i^{th}$ modality.

In an example, the acquisition module 1210 further includes:

an acquisition unit 1211, configured to acquire a sample data set in the $i^{th}$ modality, the sample data set including sample data marked with a confidence label; and a prediction unit 1212, configured to train the confidence prediction network corresponding to the $i^{th}$ modality based on the sample data marked with the confidence label.

In an example, the prediction module 1250 is further configured to perform initial classification and prediction on the sample data to obtain an initial classification and prediction result corresponding to the sample data.

An expression module 1260 is configured to express the classification label in a one-hot encoding form to obtain a one-hot encoding vector, the classification label corresponding to the sample data having a first value, and other classification labels having a second value.

A determination module 1270 is configured to determine the confidence label corresponding to the sample data based on the initial prediction classification result and the one-hot encoding vector.

In an example, the apparatus further includes:

an extraction module 1220, configured to extract candidate data features of the at least two pieces of data; and an analysis module 1230, configured to respectively perform significance analysis on the candidate data features of the at least two pieces of data based on a feature significance screening condition, to obtain the data features corresponding to the at least two pieces of data.

In an example, the analysis module 1230 is further configured to: input a candidate data feature of the data corresponding to the $i^{th}$ modality of the at least two modalities into a significance prediction network corresponding to the $i^{th}$ modality, the significance prediction network is a pre-trained network configured to perform significance analysis, and i is a positive integer; and perform the significance analysis on the candidate data feature of the data corresponding to the $i^{th}$ modality through the significance prediction network corresponding to the $i^{th}$ modality, to obtain a data feature of the data corresponding to the $i^{th}$ modality.

In an example, the analysis module 1230 is further configured to: perform significance analysis on the candidate data feature of the data corresponding to the $i^{th}$ modality through the significance prediction network corresponding to the $i^{th}$ modality, to obtain a significance score of the candidate data feature of the data corresponding to the $i^{th}$ modality; and obtain the data feature of the data corresponding to the $i^{th}$ modality based on the significance score and the candidate data feature of the data corresponding to the $i^{th}$ modality.

In an example, the candidate data feature of the data corresponding to the $i^{th}$ modality includes at least two feature elements, and the significance score includes significance sub-scores respectively corresponding to the at least two feature elements.

The analysis module 1230 is further configured to determine the feature element whose significance sub-score reaches a preset gating threshold among the at least two feature elements as the data feature of the data corresponding to the $i^{th}$ modality.

In an example, the prediction module 1250 is further configured to perform prediction according to the fused feature through a classification and prediction network to obtain the classification and prediction result corresponding to the specified classification task.

In an example, the apparatus further includes:

the acquisition module 1210 is further configured to acquire n pieces of sample data marked with classification labels, the n pieces of sample data corresponding to the at least two modalities, each piece of sample data corresponding to a modality, and n is a positive integer;

the acquisition module 1210 is further configured to acquire a confidence corresponding to each of the at least two modalities, the confidence indicates a classification and prediction probability of the modality;

the fusion module 1240 is further configured to fuse features of the n pieces of sample data based on the confidence corresponding to each of the at least two modalities, to obtain a fused feature; and a training module 1280, configured to train a candidate classification model based on the fused features and the classification labels to obtain the classification and prediction network.

In an example, the training module 1280 is further configured to: perform classification and prediction according to the fused feature through the candidate classification model to obtain the classification and prediction result; determine a loss value corresponding to the candidate classification model based on the classification and prediction result and the classification label; and adjust a model parameter of the candidate classification model based on the loss value to obtain the classification and prediction network.

Based on the above, the example of the present subject matter provides a classification and prediction apparatus. A confidence corresponding to each of at least two modalities for a specified classification task is acquired. Each of the modalities includes corresponding data. The confidence represents a classification and prediction probability corresponding to the specified classification task. Weighted fusion is performed on data features corresponding to data in the at least two modalities based on the confidence corresponding to each of the modalities, to obtain a fused feature. A classification and prediction result is obtained according to the fused feature. By adding the confidence corresponding to the modality during multimodal fusion, more weights can be assigned to the modality with a higher contribution degree during the multimodal fusion, and the accuracy of classification and prediction can be improved.

In the medical field, different disease grades corresponding to the same disease are regarded as a specified classification task, and different pathological parameters that determine results of disease grades correspond to different modalities. The same kind of pathological parameters are used as the data included in the same modality, and the confidence corresponding to each modality is determined by introducing a confidence. Based on the confidence corresponding to each modality, weighted fusion is performed on the data features corresponding to the data in each modality to obtain a fused feature, and the disease grade result is determined according to the fused feature, which is suitable for improving the accuracy of making personal medical plans for patients under precise medical care.

The classification and prediction apparatus provided in the foregoing examples is illustrated with an example of division of the foregoing function modules. In practical application, the foregoing functions may be allocated to and completed by different function modules according to requirements, that is, the internal structure of the device is divided into different function modules, so as to complete all or part of the functions described above. In addition, the examples of the classification and prediction apparatus and the classification and prediction method provided in the foregoing examples fall within a same conception. For details of a specific implementation process, refer to the method examples. Details are not described herein again.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Figure 14:
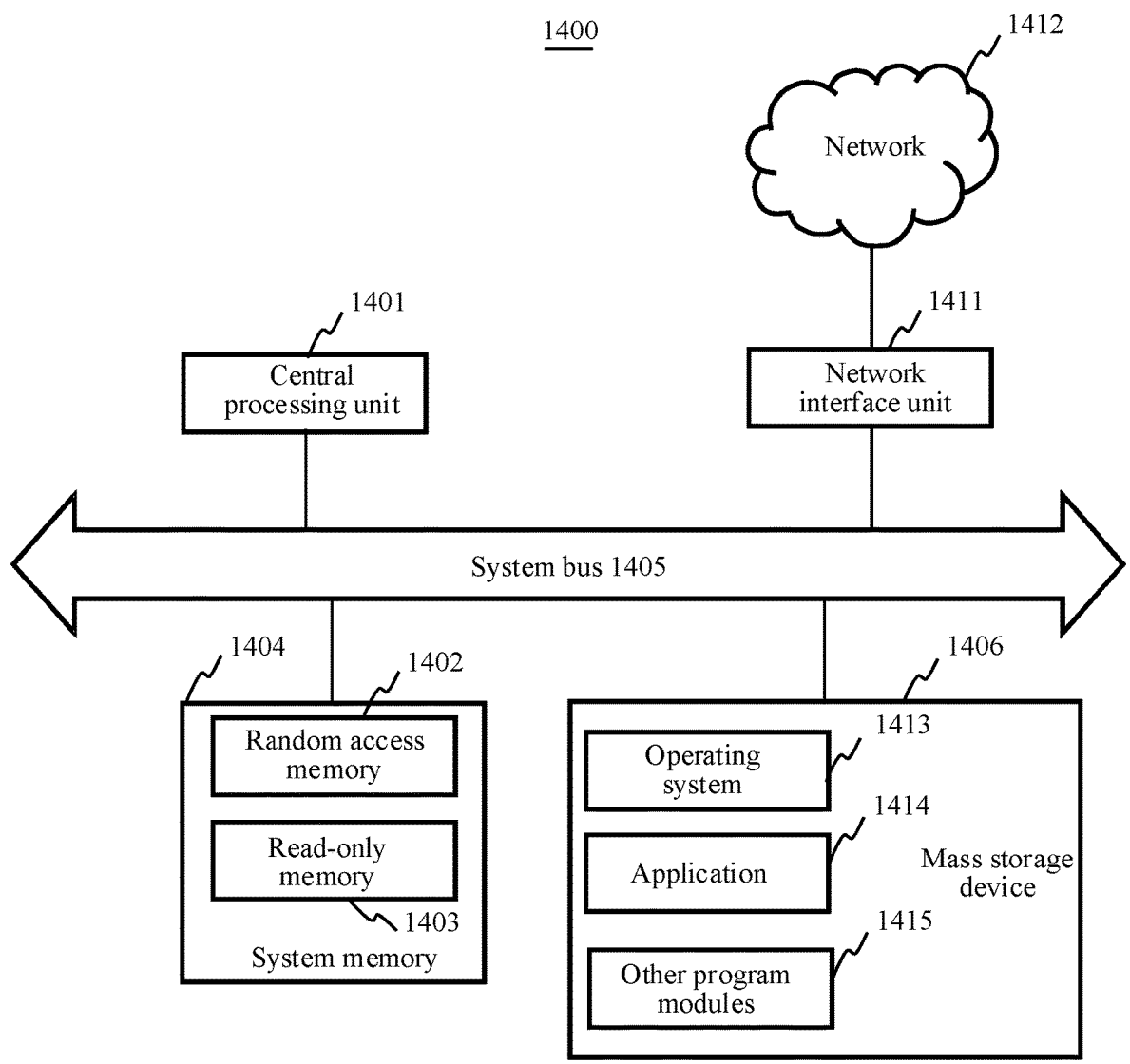
FIG. 14 is a schematic structural diagram of a server according to an example of the present subject matter.

FIG. 14 is a schematic structural diagram of a server according to an example of the present subject matter. Specifically, a server 1400 includes a central processing unit (CPU) 1401, a system memory 1404 including a random access memory (RAM) 1402 and a read-only memory (ROM) 1403, and a system bus 1405 connecting the system memory 1404 to the CPU 1401. The server 1400 further includes a mass storage device 1406 configured to store an operating system 1413, an application program 1414, and other program modules 1415.

The mass storage device 1406 is connected to the CPU 1401 by using a mass storage controller (not shown) connected to the system bus 1405. The mass storage device 1406 and a non-transitory computer-readable medium associated with the mass storage device provide non-volatile storage for the server 1400.

Generally, the computer-readable medium may include a non-transitory computer storage medium and a communication medium. The system memory 1404 and the mass storage device 1406 may be collectively referred to as a memory.

According to the various examples of the present subject matter, the server 1400 may be connected to a network 1412 by using a network interface unit 1411 that is connected to the system bus 1405, or may be connected to other types of networks or a remote computer system (not shown) by using the network interface unit 1411.

The memory further includes one or more programs, the one or more programs is stored in the memory and configured to be executed by the CPU.

An example of the present subject matter further provides a computer device. The computer device includes a processor and a memory, the memory storing at least one instruction, at least one program, a code set, or an instruction set, the at least one instruction, the at least one program, the code set, or the instruction set is loaded and executed by the processor to implement the classification and prediction method provided in the foregoing method examples.

An example of the present subject matter further provides a non-transitory computer-readable storage medium, the computer-readable storage medium storing at least one instruction, at least one program, a code set, or an instruction set, the at least one instruction, the at least one program, the code set, or the instruction set is loaded and executed by a processor to implement the classification and prediction method provided in the foregoing method examples.

An example of the present subject matter further provides a computer program product or a computer program, the computer program product or the computer program including a computer instruction, the computer instruction is stored in a non-transitory computer-readable storage medium. The processor of the computer device reads the computer instruction from the computer-readable storage medium. The processor executes the computer instruction, causing the computer device to perform the classification and prediction method according to any one of the foregoing examples.

The computer-readable storage medium may include any of a read-only memory (ROM), a random access memory (RAM), a solid state drive (SSD), an optical disc, or the like. The RAM may include a resistance random access memory (ReRAM) and a dynamic random access memory (DRAM). The serial numbers of the foregoing examples of the present subject matter are merely for description, and do not represent the preference of the examples.

The invention claimed is:

1. A classification and prediction method performed by a computer device, comprising:
   acquiring at least two pieces of data for a specified classification task, wherein
      the at least two pieces of data correspond to at least two modalities, and
      each piece of data corresponds to one modality;
   acquiring a confidence corresponding to each of the at least two modalities, wherein
      the confidence indicates a classification and prediction probability of the modality in the specified classification task;
   performing weighted fusion on data features of the at least two pieces of data based on the confidence corresponding to each of the at least two modalities to obtain a fused feature; and
   performing prediction according to the fused feature to obtain a classification and prediction result corresponding to the specified classification task.

2. The method according to claim 1, wherein the acquiring the confidence corresponding to each of the at least two modalities comprises:
   inputting data corresponding to an $i^{th}$ modality of the at least two modalities into a confidence prediction network corresponding to the $i^{th}$ modality, wherein
      the confidence prediction network is a pre-trained network configured to perform confidence analysis, and
      i is a positive integer; and
   performing the confidence analysis on the data corresponding to the $i^{th}$ modality through the confidence prediction network corresponding to the $i^{th}$ modality to obtain a confidence corresponding to the $i^{th}$ modality.

3. The method according to claim 2, wherein before the inputting, the method further comprises:
   acquiring a sample data set in the $i^{th}$ modality, the sample data set comprising sample data marked with a confidence label; and
   training the confidence prediction network corresponding to the $i^{th}$ modality based on the sample data marked with the confidence label.

4. The method according to claim 3, wherein the sample data is marked with a classification label; and the method further comprises:
   performing initial classification and prediction on the sample data to obtain an initial classification and prediction result corresponding to the sample data;
   expressing the classification label in a one-hot encoding form to obtain a one-hot encoding vector, wherein
      the classification label corresponds to the sample data having a first value and other classification labels having a second value; and
   determining the confidence label corresponding to the sample data based on the initial prediction classification result and the one-hot encoding vector.

5. The method according to claim 1, wherein before the performing weighted fusion on data features of the at least two pieces of data to obtain a fused feature, the method further comprises:
   extracting candidate data features of the at least two pieces of data; and
   respectively performing significance analysis on the candidate data features of the at least two pieces of data based on a feature significance screening condition to obtain the data features corresponding to the at least two pieces of data.

6. The method according to claim 5, wherein the respectively performing comprises:
   inputting a candidate data feature of the data corresponding to the $i^{th}$ modality of the at least two modalities into a significance prediction network corresponding to the $i^{th}$ modality, wherein
      the significance prediction network is a pre-trained network configured to perform significance analysis, and
      i is a positive integer; and
   performing the significance analysis on the candidate data feature of the data corresponding to the $i^{th}$ modality through the significance prediction network corresponding to the $i^{th}$ modality to obtain a data feature of the data corresponding to the $i^{th}$ modality.

7. The method according to claim 6, wherein the performing the significance analysis on the candidate data feature of the data corresponding to the $i^{th}$ modality through the significance prediction network corresponding to the $i^{th}$ modality to obtain a data feature of the data corresponding to the $i^{th}$ modality comprises:
   performing the significance analysis on the candidate data feature of the data corresponding to the $i^{th}$ modality through the significance prediction network corresponding to the $i^{th}$ modality to obtain a significance score of the candidate data feature of the data corresponding to the $i^{th}$ modality; and
   obtaining the data feature of the data corresponding to the $i^{th}$ modality based on the significance score and the candidate data feature of the data corresponding to the $i^{th}$ modality.

8. The method according to claim 7, wherein
   the candidate data feature of the data corresponding to the $i^{th}$ modality comprises at least two feature elements, and
   the significance score comprises significance sub-scores respectively corresponding to the at least two feature elements; and
   the obtaining comprises:
      determining one of the two feature elements whose significance sub-score reaches a preset gating threshold as the data feature of the data corresponding to the $i^{th}$ modality.

9. The method according to claim 1, wherein the performing prediction according to the fused feature to obtain a classification and prediction result corresponding to the specified classification task comprises:
   performing prediction according to the fused feature through a classification and prediction network to obtain the classification and prediction result corresponding to the specified classification task.

10. The method according to claim 9, wherein before the performing prediction according to the fused feature through a classification and prediction network to obtain the classification and prediction result corresponding to the specified classification task, the method further comprises:
   acquiring n pieces of sample data marked with classification labels, wherein
      the n pieces of sample data corresponding to the at least two modalities,
      each piece of sample data corresponding to one modality, and
      n is a positive integer;
   acquiring the confidence corresponding to each of the at least two modalities, wherein the confidence indicates the classification and prediction probability of the modality;

fusing data features of the n pieces of sample data based on the confidence corresponding to each of the at least two modalities, to obtain a fused feature; and training a candidate classification model based on the fused feature and the classification labels to obtain the classification and prediction network.

11. The method according to claim 10, wherein the training a candidate classification model based on the fused feature and the classification labels to obtain the classification and prediction network comprises:

performing classification and prediction on the fused feature through the candidate classification model to obtain the classification and prediction result;

determining a loss value corresponding to the candidate classification model based on the classification and prediction result and the classification labels; and adjusting a model parameter of the candidate classification model based on the loss value to obtain the classification and prediction network.

12. A classification and prediction apparatus, comprising:
an acquisition module configured to acquire at least two pieces of data for a specified classification task, wherein
the at least two pieces of data corresponding to at least two modalities,
each piece of data corresponding to one modality, and
the acquisition module is further configured to acquire a confidence corresponding to each of the at least two modalities, wherein
the confidence indicates a classification and prediction probability of the modality in the specified classification task;

a fusion module configured to perform weighted fusion on data features of the at least two pieces of data based on the confidence corresponding to each of the at least two modalities to obtain a fused feature; and a prediction module configured to perform prediction according to the fused feature to obtain a classification and prediction result corresponding to the specified classification task.

13. The apparatus according to claim 12, wherein the acquisition module comprises:

an input unit configured to input data corresponding to an $i^{th}$ modality of the at least two modalities into a confidence prediction network corresponding to the $i^{th}$ modality, wherein
the confidence prediction network is a pre-trained network configured to perform confidence analysis, and
i is a positive integer; and an analysis unit configured to perform the confidence analysis on the data corresponding to the $i^{th}$ modality through the confidence prediction network corresponding to the $i^{th}$ modality to obtain a confidence corresponding to the $i^{th}$ modality.

14. The apparatus according to claim 13, wherein the acquisition module further comprises:

an acquisition unit configured to acquire a sample data set in the $i^{th}$ modality, wherein the sample data set comprises sample data marked with a confidence label; and a prediction unit configured to train the confidence prediction network corresponding to the $i^{th}$ modality based on the sample data marked with the confidence label.

15. The apparatus according to claim 14, wherein
the prediction module is further configured to perform initial classification and prediction on the sample data to obtain an initial classification and prediction result corresponding to the sample data; and the apparatus further comprises:

an expression module configured to express the classification label in a one-hot encoding form to obtain a one-hot encoding vector, wherein
the classification label corresponding to the sample data having a first value and other classification labels having a second value; and a determination module configured to determine the confidence label corresponding to the sample data based on the initial prediction classification result and the one-hot encoding vector.

16. The apparatus according to claim 12, further comprising:

an extraction module configured to extract candidate data features of the at least two pieces of data; and an analysis module configured to respectively perform significance analysis on the candidate data features of the at least two pieces of data based on a feature significance screening condition to obtain the data features corresponding to the at least two pieces of data.

17. The apparatus according to claim 16, wherein the analysis module is further configured to:

input a candidate data feature of the data corresponding to the $i^{th}$ modality of the at least two modalities into a significance prediction network corresponding to the $i^{th}$ modality, wherein
the significance prediction network is a pre-trained network configured to perform significance analysis, and
i is a positive integer; and perform the significance analysis on the candidate data feature of the data corresponding to the $i^{th}$ modality through the significance prediction network corresponding to the $i^{th}$ modality to obtain a data feature of the data corresponding to the $i^{th}$ modality.

18. A computer device comprising a processor and a memory storing program instructions loadable and executable by the processor to implement the classification and prediction method according to claim 1.

19. A non-transitory computer-readable storage medium storing program instructions executable by a processor to implement the classification and prediction method according to claim 1.

* * * * *